(12) United States Patent
Tsuboi et al.

(10) Patent No.: US 10,098,142 B2
(45) Date of Patent: Oct. 9, 2018

(54) TERMINAL APPARATUS, BASE STATION APPARATUS, COMMUNICATION SYSTEM, RESOURCE MANAGEMENT METHOD, AND INTEGRATED CIRCUIT

(71) Applicant: Sharp Kabushiki Kaisha, Sakai, Osaka (JP)

(72) Inventors: Hidekazu Tsuboi, Sakai (JP); Katsunari Uemura, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 15/119,605

(22) PCT Filed: Mar. 4, 2015

(86) PCT No.: PCT/JP2015/056333
§ 371 (c)(1),
(2) Date: Aug. 17, 2016

(87) PCT Pub. No.: WO2015/137208
PCT Pub. Date: Sep. 17, 2015

(65) Prior Publication Data
US 2017/0064734 A1 Mar. 2, 2017

(30) Foreign Application Priority Data
Mar. 14, 2014 (JP) ................. 2014-051841

(51) Int. Cl.
*H04W 4/00* (2018.01)
*H04W 72/12* (2009.01)
(Continued)

(52) U.S. Cl.
CPC ... *H04W 72/1284* (2013.01); *H04W 28/0278* (2013.01); *H04W 72/1268* (2013.01); *H04W 76/14* (2018.02)

(58) Field of Classification Search
CPC ......... H04W 72/1284; H04W 72/1268; H04W 76/023; H04W 28/0278
See application file for complete search history.

(56) References Cited

U.S. PATENT DOCUMENTS 9,961,693 B2 * 5/2018 Tsuboi .................. H04W 72/10
2013/0064103 A1 * 3/2013 Koskela ............ H04W 72/1284
370/252
(Continued)

FOREIGN PATENT DOCUMENTS

| EP | 2701427 A1 | 2/2014 |
|---|---|---|
| WO | WO 2011/051745 A1 | 5/2011 |
| WO | WO 2014/034572 A1 | 3/2014 |

OTHER PUBLICATIONS

3GPP TR 36.843 V1.0.0 (Nov. 2013), "3rd Generation Partnership Project; Technical Specification Group RAN; Study on LTE Device to Device Proximity Services-Radio Aspects", total 32 pages, http://www.3gpp.org/DynaReport/36843.htm.
(Continued)

*Primary Examiner* — Kevin Mew
(74) *Attorney, Agent, or Firm* — Birch, Stewart, Kolasch & Birch, LLP

(57) ABSTRACT

A terminal apparatus generates a transmission resource request message that includes identifier information for identifying a service or an application to which transmission data belongs, or frequency information indicating a frequency that is used for the service or the application to which the transmission data belongs, and notifies the base station apparatus of the generated transmission resource request message, in a case where the transmission data for the service or the application for any device-to-device data communication is prepared in a transmission buffer of the terminal apparatus itself.

4 Claims, 8 Drawing Sheets

(51) Int. Cl.
*H04W 28/02* (2009.01)
*H04W 76/14* (2018.01)

(56) References Cited

U.S. PATENT DOCUMENTS

| | | | | |
|---|---|---|---|---|
| 2013/0322413 A1* | 12/2013 | Pelletier | ............ | H04W 72/1289 370/336 |
| 2015/0172037 A1 | 6/2015 | Morita | | |
| 2015/0296407 A1* | 10/2015 | Guo | .................... | H04W 76/043 370/230 |
| 2016/0044737 A1* | 2/2016 | Kwon | ................. | H04W 76/023 370/328 |
| 2016/0095133 A1* | 3/2016 | Hwang | .................... | H04L 1/00 370/329 |
| 2016/0112910 A1* | 4/2016 | Agiwal | ................. | H04W 72/04 370/331 |
| 2017/0006628 A1* | 1/2017 | Takahashi | ............. | H04W 72/02 |
| 2017/0006649 A1* | 1/2017 | Zhao | .................... | H04W 28/06 |
| 2017/0013634 A1* | 1/2017 | Tsuboi | ................. | H04W 76/14 |
| 2017/0019893 A1* | 1/2017 | Zhao | ................. | H04W 28/0278 |
| 2017/0111818 A1* | 4/2017 | Sebire | .............. | H04W 28/0278 |
| 2017/0127251 A1* | 5/2017 | Yi | ........................ | H04W 76/023 |
| 2017/0171837 A1* | 6/2017 | Chen | .................... | H04W 72/04 |
| 2017/0238337 A1* | 8/2017 | Lee | .................. | H04W 72/1289 370/329 |
| 2018/0027565 A1* | 1/2018 | Kwon | ................. | H04W 76/046 370/329 |

OTHER PUBLICATIONS

Ericsson, "Resource allocation for D2D transmitters in coverage", 3GPP TSG-RAN WG2 #85, Prague, Czech Republic, Feb. 10-14, 2014, Tdoc R2-140625, total 5 pages, http://www.3gpp.org/ftp/tsg_ran/WG2_RL2/TSGR2_85/Docs/R2-140625.zip.

ETSI MCC, "Report of 3GPP TSG RAN WG2 meeting #85", 3GPP TSG RAN Working Group 2 meeting #85bis, Valencia, Spain, Mar. 31-Apr. 4, 2014, R2-141854, total 155 pages, http://www.3gpp.org/ftp/tsg_ran/WG2_RL2/TSGR2_85/Report/.

\* cited by examiner

TERMINAL APPARATUS, BASE STATION APPARATUS, COMMUNICATION SYSTEM, RESOURCE MANAGEMENT METHOD, AND INTEGRATED CIRCUIT

TECHNICAL FIELD

Embodiments of the present invention relate to a technology associated with a terminal apparatus, a base station apparatus, a communication system, a resource management method, and an integrated circuit, in all of which resource management for device-to-device communication is efficiently performed.

This application claims the benefit of Japanese Patent Application No. 2014-051841 filed on Mar. 14, 2014, the entire contents of which are incorporated herein by reference.

BACKGROUND ART

In 3rd Generation Partnership Project (3GPP) that is a standardization project, a standardization process for Evolved Universal Terrestrial Radio Access (which is hereinafter referred to as EUTRA) that realizes high-speed communication has been performed by employing flexible scheduling in prescribed frequency time units, which is referred to as an Orthogonal Frequency-Division Multiplexing (OFDM) communication scheme or a resource block.

Furthermore, in 3GPP, discussions on Advanced EUTRA that realizes higher-speed data transfer and has forward compatibility with EUTRA have taken place.

In Advanced EUTRA, introduction of inter-terminal apparatus (Device to Device (D2D)) communication is considered. A mechanism (ProSe Didcovery), as a service between terminal apparatuses in proximity to each other (Proximity based Services (ProSe)), for checking (discovering) in the D2D communication whether or not the terminal apparatuses are located close to each other, a mechanism (ProSe Communication) for the terminal apparatuses to perform communication without involving the base station apparatus, or the like are mainly considered (NPL 1).

CITATION LIST

Non-Patent Literature

NPL 1: 3GPP TS 36.843 V1.0.0 (2013-11) http://www.3gpp.org/DynaReport/36843.htm
NPL 2: Draft Report of 3GPP TSG RAN WG2 meeting #85 http://www.3gpp.org/ftp/tsg_ran/WG2_RL2/TSGR2_85/Report/
NPL 3: R2-140625, Ericsson, "Resource allocation for D2D transmitters in coverage" http://www.3gpp.org/ftp/tsg_ran/WG2_RL2/TSGR2_85/Docs/R2-140625.zip

DISCLOSURE OF THE INVENTION

Problems to be Solved by the Invention

In NPL 2, it is disclosed that a communication resource for the inter-terminal apparatus communication is configured by the base station apparatus. For example, a method in which the base station apparatus notifies the terminal apparatus of a reception resource that is used for the inter-terminal apparatus communication, with broadcast information or a fixed configuration and, based on a resource request from the terminal apparatus, a transmission resource that is used for the inter-terminal apparatus communication is allocated to the terminal apparatus, a method in which the base station apparatus notifies the terminal apparatus of a transmission and reception resource that is used for the inter-terminal apparatus communication, with broadcast information or a fixed configuration, and the terminal apparatus independently selects the transmission resource from among the notified resources, or the like is disclosed.

However, in NPL 2, what method the terminal apparatus uses to acquire the transmission resource is not disclosed as a specific method.

Furthermore, in NPL 3, it is disclosed that, based on the resource request from the terminal apparatus, a new message in which a message (BSR) for reporting an existing transmission buffer status is applied to the D2D communication is introduced as means of allocating to the terminal apparatus the transmission resource that is used for the inter-terminal apparatus communication, but in a case where multiple resources for the inter-terminal apparatus communication are present, the base station apparatus cannot suitably determine which transmission resource may be allocated to the terminal apparatus.

An object of embodiments of the present invention, which were contrived in view of the problems described above, is to deal with at least one of the problems described above by providing a technology associated with a terminal apparatus, a base station apparatus, a communication system, a resource management method, and an integrated circuit, in all of which it is possible to efficiently perform resource management for device-to-device communication.

Means for Solving the Problems (1) In order to accomplish the object described above, the following means are contrived. That is, according to an embodiment of the present invention, there is provided a terminal apparatus that performs inter-terminal apparatus data communication (device-to-device data communication) which does not involve a base station apparatus, including means of generating a transmission resource request that includes identifier information for identifying a service or an application to which transmission data belongs, or frequency information indicating a frequency that is used for the service or the application to which the transmission data belongs, and of notifying the base station apparatus of the generated transmission resource request, in a case where the transmission data for the service or the application for any device-to-device data communication is prepared in a transmission buffer of the terminal apparatus itself.

(2) Furthermore, in the terminal apparatus according to the embodiment of the present invention, the transmission resource request is a Buffer Status Report for notifying an amount of buffer as a transmission buffer for the transmission data, and includes the identifier information or the frequency information, and information indicating the amount of buffer for the transmission data.

(3) Furthermore, according to an embodiment of the present invention, there is provided a base station apparatus that allocates to a terminal apparatus a transmission resource for inter-terminal apparatus data communication (device-to-device data communication) which does not involve the base station apparatus, including means of receiving a transmission resource request that includes identifier information for identifying a service or an application to which transmission data from the terminal apparatus belongs, or frequency information indicating a frequency that is used for the service or the application to which the transmission data belongs is received, and of selecting a transmission resource that is to be allocated to the terminal apparatus, from among resources for the device-to-device data communication at a frequency that corresponds to the identifier information or the frequency information.

(4) Furthermore, according to an embodiment of the present invention, there is provided a communication system including: a terminal apparatus that performs inter-terminal apparatus data communication (device-to-device data communication) which does not involve the base station apparatus; and a base station apparatus that allocates a transmission resource for the device-to-device data communication to the terminal apparatus, in which the terminal apparatus generates a transmission resource request that includes identifier information for identifying a service or an application to which transmission data belongs, or frequency information indicating a frequency that is used for the service or the application to which the transmission data belongs, and notifies the base station apparatus of the generated transmission resource request, in a case where the transmission data for the service or the application for any device-to-device data communication is prepared in a transmission buffer of the terminal apparatus itself, and in which the base station apparatus includes means of receiving the transmission resource request from the terminal apparatus, and of selecting a transmission resource that is to be allocated to the terminal apparatus, from among resources for the device-to-device data communication at a frequency that corresponds to the identifier information or the frequency information.

(5) Furthermore, according to an embodiment of the present invention, there is provided a resource management method that is applied to a terminal apparatus which performs inter-terminal apparatus data communication (device-to-device data communication) which does not involve a base station apparatus, the method including: a step of generating a transmission resource request that includes identifier information for identifying a service or an application to which transmission data belongs, or frequency information indicating a frequency that is used for the service or the application to which the transmission data belongs; and a step of notifying the base station apparatus of the generated transmission resource request, in which the generation step and the notification step are performed in a case where the transmission data for the service or the application for any device-to-device data communication is prepared in a transmission buffer of the terminal apparatus itself.

(6) Furthermore, according to an embodiment of the present invention, there is provided a resource management method that is applied to a base station apparatus which allocates to a terminal apparatus a transmission resource for inter-terminal apparatus data communication (device-to-device data communication) which does not involve the base station apparatus, the method including: a step of receiving a transmission resource request that includes identifier information for identifying a service or an application to which transmission data from the terminal apparatus belongs, or frequency information indicating a frequency that is used for the service or the application to which the transmission data belongs; and a step of selecting a transmission resource that is to be allocated to the terminal apparatus, from among resources for the device-to-device data communication at a frequency that corresponds to the identifier information or the frequency information.

(7) Furthermore, according to an embodiment of the present invention, there is provided an integrated circuit that is built into a terminal apparatus that performs inter-terminal apparatus data communication (device-to-device data communication) which does not involve a base station apparatus, the circuit causing the terminal apparatus to perform; a function of generating a transmission resource request that includes identifier information for identifying a service or an application to which transmission data belongs, or frequency information indicating a frequency that is used for the service or the application to which the transmission data belongs; and a function of notifying the base station apparatus of the generated transmission resource request, in which the generation function and the notification functions are performed in a case where the transmission data for the service or the application for any device-to-device data communication is prepared in a transmission buffer of the terminal apparatus itself.

(8) Furthermore, according to an embodiment of the present invention, there is provided an integrated circuit that is built into a base station apparatus which allocates to a terminal apparatus a transmission resource for inter-terminal apparatus data communication (device-to-device data communication) which does not involve the base station apparatus, the circuit causing the base station apparatus to perform: a function of receiving a transmission resource request that includes identifier information for identifying a service or an application to which transmission data from the terminal apparatus belongs, or frequency information indicating a frequency that is used for the service or the application to which the transmission data belongs; and a function of selecting a transmission resource that is to be allocated to the terminal apparatus, from among resources for the device-to-device data communication at a frequency that corresponds to the identifier information or the frequency information.

Effects of the Invention

As described above, according to embodiments of the present invention, a technology that makes it possible to efficiently perform resource management for device-to-device communication can be provided.

MODE FOR CARRYING OUT THE INVENTION

Figure 1:
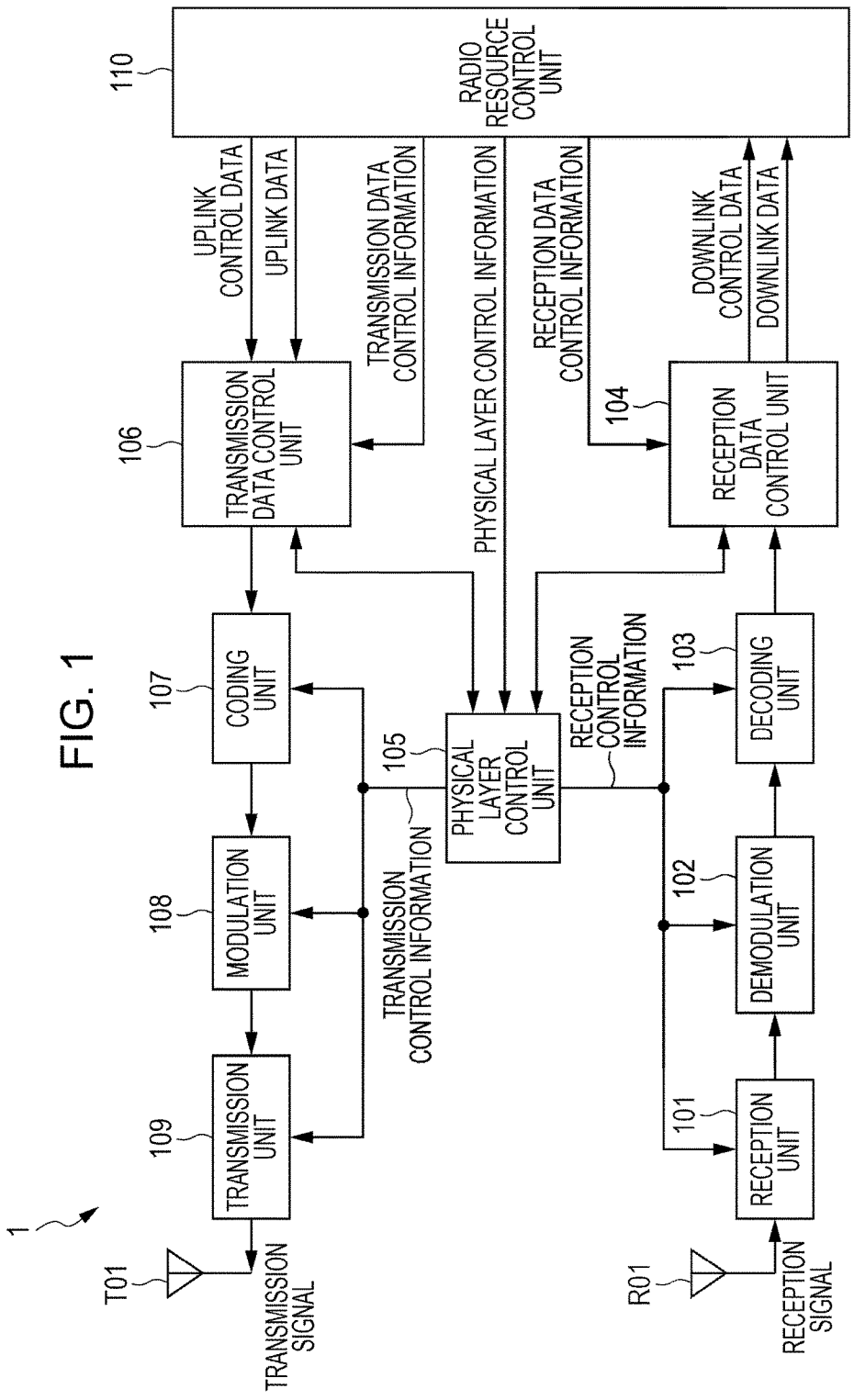
FIG. 1 is a block diagram illustrating one example of a schematic constitution of a terminal apparatus according to an embodiment of the present invention.

A technology relating to each embodiment of the present invention will be described briefly below.

[Physical Channel/Physical Signal]

Physical Channels and physical signals that are mainly in EUTRA and Advanced EUTRA are described. A channel means a medium that is used for signal transmission and reception, and a Physical Channel means a physical medium that is used for the signal transmission and reception. According to the present invention, the Physical Channel and the signal can be used synonymously. There is a likelihood that in EUTRA and Advanced EUTRA, the Physical Channel will be added in future or an architecture or format type thereof will be changed or added, but this change or addition does not have any influence on a description of each embodiment of the present invention.

In EUTRA and Advanced EUTRA, scheduling of the Physical Channel or the physical signal is managed using a radio frame. One radio frame is 10 ms, and one radio frame is constituted from 10 subframes. In addition, one subframe is constituted from two slots (that is, one subframe is 1 ms and one slot is 0.5 ms). Furthermore, management is performed using a resource block as a minimum unit for scheduling for allocating the physical Channel. The resource block is defined by a fixed frequency domain that is constituted from a set of multiple subcarriers (for example, 12 subcarriers) along a frequency axis and by a domain that is constituted from a fixed transmission time interval (1 slot).

A Synchronization Signal is constituted from 3 types of primary synchronization signals and a secondary synchronization signal that is constituted from 31 types of codes which are alternately arranged in the frequency domain. With a combination of these signals, the primary synchronization signal and the secondary synchronization signal, 504 cell identifiers (physical cell IDs (Physical Cell Identities (PCIs))) for identifying a base station apparatus and a frame timing for wireless synchronization are indicated. A terminal apparatus specifies the physical cell ID of the Synchronization Signal that is received through cell search.

A Physical Broadcast CHannel (PBCH) is transmitted for the purpose of notifying (configuring) a control parameter (broadcast information (System Information (SI))) that is used in a shared manner in terminal apparatuses within a cell. When it comes to the broadcast information that is not notified on the Physical Broadcast Channel, a radio resource with which the broadcast information is transmitted on a Physical Downlink Control Channel is notified to the terminal apparatus within the cell, and with the notified radio resource, a layer 3 message (system information) that notifies the broadcast information using a Physical Downlink Shared Channel is transmitted.

As pieces of broadcast information, a Cell Global Identifier (CGI) indicating a cell-dedicated identifier, a Tracking Area Identifier (TAI) for managing a waiting area by paging, random access configuration information, transmission timing adjustment information, shared radio resource configuration information in the cell, neighboring cell information, uplink access limitation information, and the like are notified.

Downlink reference signals are categorized by their usage into multiple types. For example, a cell-specific RS (Cell-specific Reference Signals (CRS)) is a pilot signal that is transmitted with a prescribed power for every cell, and is a downlink reference signal that is periodically iterated in the frequency domain and the time domain based on a prescribed rule. The terminal apparatus measures received quality for every cell by receiving the cell-specific RS. Furthermore, the terminal apparatus uses a downlink cell-specific RS also as a reference signal for demodulation of the Physical Downlink Control Channel that is transmitted at the same time as the cell-specific RS, or of the Physical Downlink Shared Channel. As a sequence that is used for the cell-specific RS, a sequence that is identifiable for every cell is used.

Furthermore, the downlink reference signal is also used for estimation of propagation fluctuation in downlink. The downlink reference signal that is used for the estimation of the propagation fluctuation is referred to as a Channel State Information Reference Signals (CSI-RS). Furthermore, the downlink reference signal that is configured, in a dedicated manner, for the terminal apparatus is referred to as UE-specific Reference Signals (URS) or Dedicated RS (DRS), and is referred to for channel compensation processing of the channel that is to be performed when demodulating the Physical Downlink Control Channel or the Physical Downlink Shared Channel.

A Physical Downlink Control Channel (PDCCH) is transmitted in several OFDM symbols (for example, 1 to 4 OFDM symbols) starting from the head of each subframe. An Enhanced Physical Downlink Control Channel (EPDCCH) is a Physical Downlink Control Channel that is allocated to the OFDM symbols to which the Physical Downlink Shared Channel (PDSCH) is allocated. The PDCCH or the EPDCCH is used for the purpose of notifying radio resource allocation information in accordance with the scheduling by the base station apparatus for the terminal apparatus, or information indicating an amount of adjustment for an increase or decrease in transmit power. Unless otherwise specified, the Physical Downlink Control Channel (PDCCH) that will be described below means both of the Physical Channels, the PDCCH and the EPDCCH.

The terminal apparatus monitors the Physical Downlink Control Channel that is destined for the terminal apparatus itself before transmitting and receiving a layer 2 message and the layer 3 message (paging, a handover command, or the like) that are downlink data or downlink control data, and receives the Physical Downlink Control Channel that is destined for the terminal apparatus itself. Thus, the terminal apparatus needs to acquire from the Physical Downlink Control Channel the radio resource allocation information that is referred to as an uplink grant at the time of the transmission and as a downlink grant (a downlink assignment) at the time of the reception. Moreover, in addition to being transmitted in the OFDM symbol described above, it is possible that the Physical Downlink Control Channel is also constituted to be transmitted in a region of the resource block that is allocated in a dedicated manner from the base station apparatus to the terminal apparatus.

A Physical Uplink Control CHannel (PUCCH) is used for an acknowledgement response (ACKnowledgement/Negative ACKnowledgement (ACK/NACK)) for reception of data that is transmitted on the Physical Downlink Shared Channel, for downlink channel (channel state) information (Channel State Information (CSI)), or for making an uplink radio resource allocation request (a radio resource request or a Scheduling Request (SR)).

Pieces of CSI include a Channel Quality Indicator (CQI), a Precoding Matrix Indicator (PMI), a Precoding Type Indicator (PTI), and a Rank Indicator (RI). Each Indicator may be expressed as Indication.

The Physical Downlink Shared Channel (PDSCH) is also used for notifying the terminal apparatus of the broadcast information (the system information) that is not notified by the paging or on the physical broadcast channel, as the layer 3 message, in addition to the downlink data. The radio resource allocation information of the Physical Downlink Shared Channel is indicated with the Physical Downlink Control Channel. The Physical Downlink Shared Channel is transmitted in a state of being allocated to OFDM symbols other than the OFDM symbols in which the Physical Downlink Control Channel is transmitted. That is, the Physical Downlink Shared Channel and the Physical Downlink Control Channel are time-multiplexed within one subframe.

It is possible that uplink data and uplink control data mainly transmitted on a Physical Uplink Shared Channel (PUSCH), and that the PUSCH includes control data, such as the received quality of the downlink or the ACK/NACK. Furthermore, the Physical Uplink Shared Channel (PUSCH) is also used for the terminal apparatus to notify the base station apparatus of uplink control information as the layer 3 message, in addition to the uplink data. Furthermore, as is the case in the downlink, the radio resource allocation information of the Physical Uplink Shared Channel is indicated with the Physical Downlink Control Channel.

Included in an Uplink Reference Signal (which is also referred to as an uplink reference signal, a pilot signal, or an uplink pilot channel) are a Demodulation Reference Signal (DMRS) that is used for the base station apparatus to demodulate the Physical Uplink Control Channel (PUCCH) and/or the Physical Uplink Shared Channel (PUSCH) and a Sounding Reference Signal (SRS) that is used for the base station apparatus to mainly estimate an uplink channel state. Furthermore, as the Sounding Reference Signals, there are a periodic Sounding Reference Signal (Periodic SRS) that is periodically transmitted and an aperiodic Sounding Reference Signal (Aperiodic SRS) that is transmitted when there is an instruction to transmit the Aperiodic SRS from the base station apparatus.

A Physical Random Access Channel (PRACH) is a channel that is used for notifying (configuring) a preamble sequence, and has a guard time. The preamble sequence is constituted in such a manner that information is notified to the base station apparatus with multiple sequences. For example, in a case where 64 types of sequences are prepared, 6-bit information can be indicated to the base station apparatus. The Physical Random Access Channel is used as means by which the terminal apparatus has access to the base station apparatus.

The terminal apparatus uses the Physical Random Access Channel in order to make an uplink radio resource request when the Physical Uplink Control Channel is not configured, to make a request to the base station apparatus for the transmission timing adjustment information (which is also referred to as timing advance (TA)) indispensable for adjusting an uplink transmission timing to a reception timing window of the base station apparatus, or to perform an operation like this. Furthermore, the base station apparatus can also make a request to the terminal apparatus for starting of a random access procedure using the Physical Downlink Control Channel.

In addition, there is a D2D synchronization signal (D2DSS) that a device which is a synchronization source transmits in order to be synchronized for D2D communication. In a case where the base station apparatus is the synchronization source, the primary synchronization signal and the secondary synchronization signal are used as the D2DSS. In a case where the synchronization source is other than the base station apparatus, a primary D2D synchronization signal (PD2DSS) that is a Zadoff-Chu sequence and a secondary D2D synchronization signal (SD2DSS) that is an M sequence are used as the D2DSS. Furthermore, a physical D2D synchronization channel (PD2DSCH) on which an identifier of a synchronization source apparatus, a type of synchronization source apparatus, a control signal, and the like are notified is considered.

Moreover, detailed descriptions of Physical Channels or physical signals other than these are omitted because they have no relationship with each embodiment of the present invention. As Physical Channels or physical signals of which the descriptions are omitted, there are a Physical Control Format Indicator CHannel (PCFICH), a Physical Hybrid ARQ Indicator CHannel (PHICH), a Physical Multicast CHannel (PMCH) and the like.

[Wireless Network]

A range (a communication area) in which each frequency is available for communication, which is controlled by the base station apparatus, is regarded as a cell. At this time, the communication area that is covered by the base station apparatus may vary in size and shape from one frequency to another. Furthermore, the area that is covered may vary from one frequency to another. Furthermore, when cells that are covered by different types of base station apparatuses or that have different radii are present in a mixed manner in an area where the same frequency or different frequencies are available and one communication system is formed, this wireless network is referred to as a heterogeneous network.

The terminal apparatus regards the inside of the cell as the communication area, and as such operates. When the terminal apparatus moves from a certain cell to a different cell, the terminal apparatus moves to a separate suitable cell by a cell re-selection procedure at the time of a non-wireless connection (which is also referred to as an idle state or an RRC_IDLE state) and by a handover procedure at the time of a wireless connection (which is also referred to as a connected state or RRC_CONNECTED state). The suitable cell indicates a cell in which it is determined that, generally, the access by the terminal apparatus is not allowed based on information that is designated from the base station apparatus, and in which the received quality of the downlink satisfies a prescribed condition.

The base station apparatus manages a certain cell that is an area where it is possible that the terminal apparatus performs communication, from one frequency to another. One base station apparatus may manage multiple cells.

When it is possible that the terminal apparatus communicates with a certain base station apparatus, among cells that are covered by the certain base station apparatus, a cell that is configured in such a manner that the cell is used for communication with the terminal apparatus is referred to as a Serving Cell, the other cells that are not used for the communication are referred to as Neighboring cells.

[Structure of a Wireless Protocol]

Figure 6:
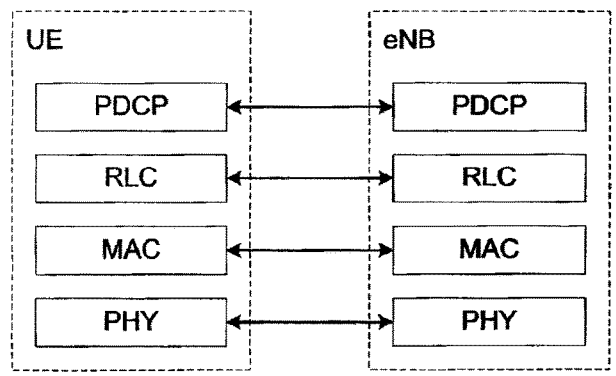
FIG. 6 is a diagram illustrating a User-plane (U-Plane (UP)) protocol stack according to the embodiment of the present invention.

FIG. 6 is a diagram illustrating a User-plane (U-Plane) (UP) protocol stack that handles user data of the terminal apparatus and the base station apparatus on an EUTRA wireless network (EUTRAN). Furthermore, FIG. 7 is a diagram illustrating a Control-plane (C-Plane) (CP) protocol stack that handles control data.

Figure 7:
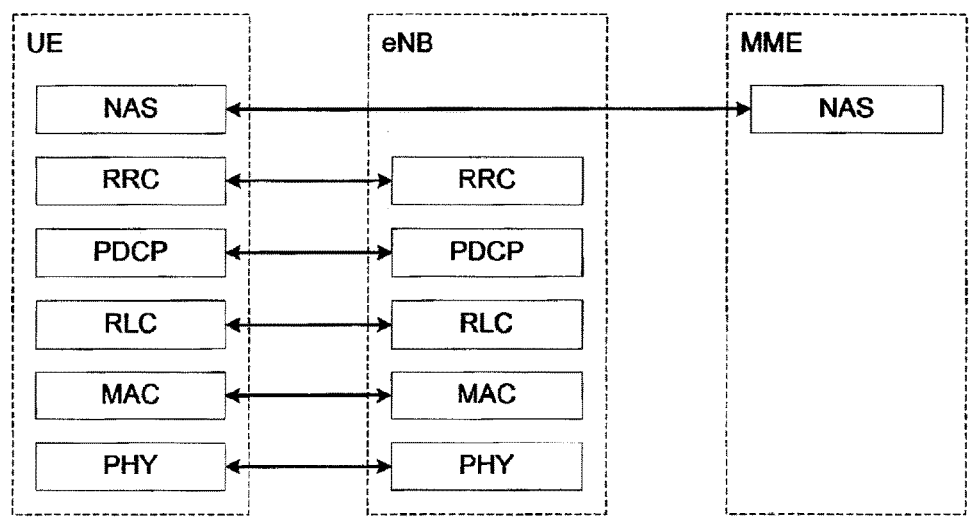
FIG. 7 is a diagram illustrating a Control-plane (C-Plane (CP)) protocol stack according to the embodiment of the present invention.

In FIGS. 6 and 7, a Physical layer (PHY layer) provides a transfer service to a higher layer using a Physical Channel. The PHY layer is connected to a higher-level Medium Access Control layer (MAC layer) with a transport channel. Through the transport channel, data moves between layers, the MAC layer and the PHY layer. Between the PHY layers of the terminal apparatus and the base station apparatus, data transmission and reception are performed through the Physical Channel.

The MAC layer performs mapping of various logical channels on various transport channels. The MAC layer is connected to a higher-level Radio Link Control layer (RLC layer) with a logical channel. The logical channel is broadly divided by a type of information that is transferred, and is divided into a control channel on which control information is transferred and a traffic channel on which user information is transferred. In order to perform intermittent reception and transmission (DRX and DTX), the MAC layer has a function of performing control of the PHY layer, a function of executing the random access procedure, a function of notifying information on the transmit power, a function of performing HARQ control, and the like.

The RLC layer performs Segmentation and Concatenation of data that is received from the higher layer, and adjusts a data size in such a manner that a lower layer can suitably perform data transmission. Furthermore, the RLC layer has a function for guaranteeing Quality of Service (QoS) that is requested by each piece of data. That is, the RLC layer has a function, such as data re-transmission control.

In order to efficiently transfer in a wireless section an IP packet that is the user data, a Packet Data Convergence Protocol layer (PDCP layer) has a header compression function of performing compression of unnecessary control information. Furthermore, the PDCP layer also has a data coding function.

In addition, as the control-plane protocol stack, there is a Radio Resource Control layer (RRC layer). The RRC layer performs configuration or reconfiguration of a Radio Bearer (RB), and performs control of the logical channel, the transport channel, and the Physical Channel. The RB is divided into a Signaling Radio Bearer (SRB) and a Data Radio Bearer (DRB), and the SRB is used as a path along which an RRC message that is the control information is transmitted. The DRB is used as a path along which the user data is transmitted. Configuration of each RB is performed between the RRC layers of the base station apparatus and the terminal apparatus.

The PHY layer corresponds to a physical layer that is the first layer in a hierarchical structure of the Open Systems Interconnection (OSI) model, the MAC layer, and the RLC layer and the PDCP layer correspond to a data link layer that is the second layer of the OSI model, and the RRC layer corresponds to a network layer that is the third layer of the OSI model.

Furthermore, a signaling protocol that is used between the network and the terminal apparatus is divided into an Access Stratum (AS) protocol and a Non-Access Stratum (NAS) protocol. For example, a protocol of a layer that is the RRC layer or below the RRC layer is the access stratum protocol that is used between the terminal apparatus and the base station apparatus. Furthermore, protocols, such as Connection Management (CM) and Mobility Management (MM) of the terminal apparatus, are the Non-Access Stratum protocols, and are used between the terminal apparatus and a core network (CN). For example, as illustrated in FIG. 7, communication that uses the Non-Access Stratum protocol is performed transparently, through the base station apparatus, between the terminal apparatus and a Mobility Management Entity (MME).

[Random Access Procedure]

The random access procedure will be described below. As the random access procedures, there are two access procedures, a contention-based Random Access procedure and a non-contention based Random Access procedure.

The contention-based Random Access procedure is a random access procedure in which there is a likelihood that contention will take place between mobile station apparatuses, and is performed at a Scheduling Request, such as the time from a state where a connection (communication with) to the base station apparatus is not made to when initial access takes place or a case where the connection to the base station apparatus is made, but uplink data transmission takes place to the mobile station apparatus in a state where uplink synchronization is no longer maintained.

The non-contention based Random Access procedure is a random access procedure in which the contention does not take place between the mobile station apparatuses. In order to quickly achieve the uplink synchronization between the mobile station apparatus and the base station apparatus in a case where a connection is made between the base station apparatus and the mobile station apparatus but the uplink synchronization is no longer maintained, in a special case such as a case where the handover or the transmission timing for the mobile station apparatus is not enabled, the mobile station apparatus starts the random access procedure when is instructed by the base station apparatus to do so. An instruction to execute the non-contention based Random Access procedure is provided using a Radio Resource Control (RRC) (Layer 3) layer message and control data on the Physical Downlink Control Channel (PDCCH).

Figure 8:
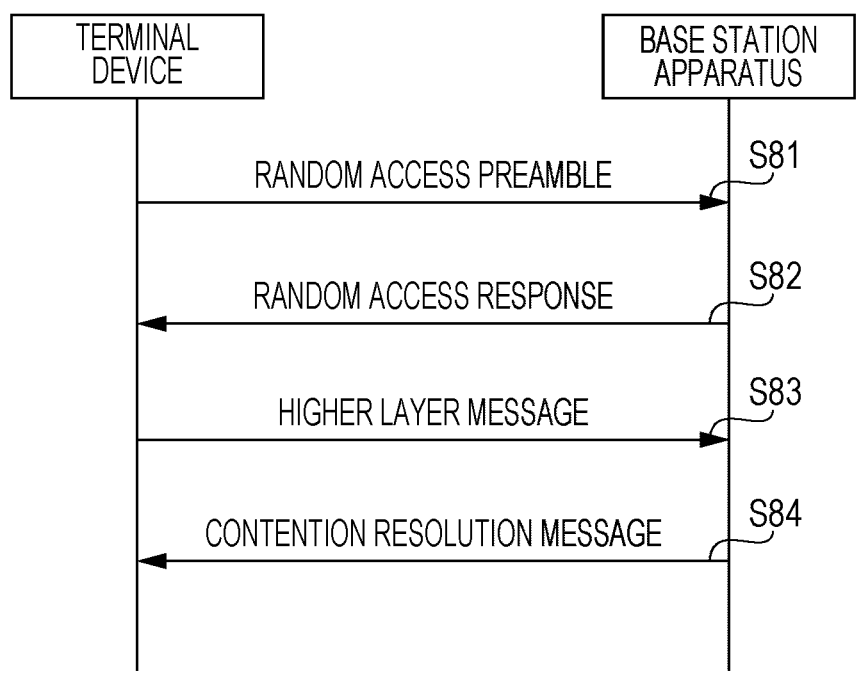
FIG. 8 is a sequence chart illustrating one example relating to a contention-based random access procedure according to the embodiment of the present invention.

The contention-based Random Access procedure is described briefly referring to FIG. 8. First, the terminal apparatus transmits a random access preamble to the base station apparatus (message 1: (1) in Step S81). Then, the base station apparatus that receives the random access preamble transmits a response (a random access response) to the random access preamble to the terminal apparatus (message 2: (2) in Step S82). The terminal apparatus transmits a higher layer (Layer 2/Layer 3) message, based on scheduling information that is included in the random access response (message 3: (3) in Step S83). The base station apparatus transmits a contention resolution message to the terminal apparatus that receives the higher layer message of (3) (message 4: (4) in Step S84). Moreover, the Contention-based Random Access is also referred to as random preamble transmission.

Figure 9:
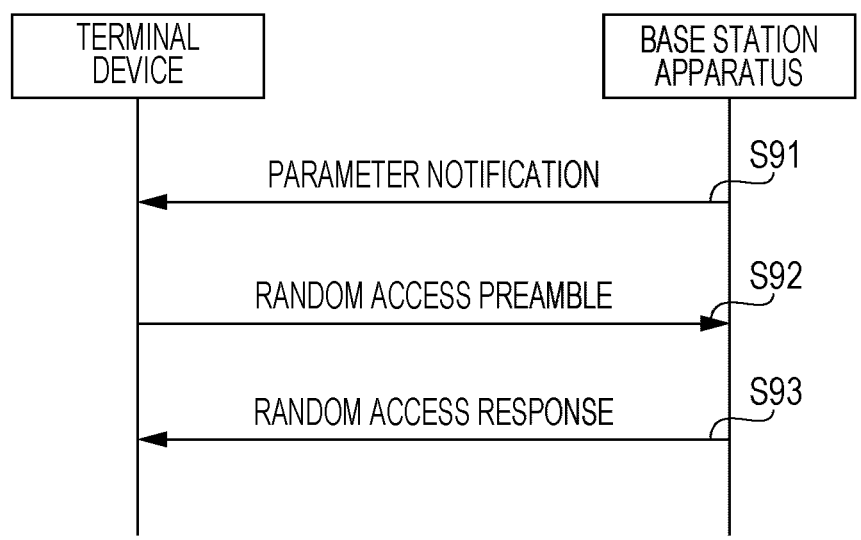
FIG. 9 is a sequence chart illustrating one example relating to a non-contention based random access procedure according to the embodiment of the present invention.

Next, the non-contention based Random Access procedure is described briefly referring to FIG. 9. First, the base station apparatus notifies the terminal apparatus of a preamble number (or a sequence number) and a random access channel number to be used (message 0: (1)' in Step S91). The terminal apparatus transmits the random access preamble of the designated preamble number to a designated Random Access Channel (RACH) (message 1: (2)' in Step S92). Then, the base station apparatus that receives the random access preamble transmits the response (the random access response) to the random access preamble to the terminal apparatus (message 2: (3)' in Step S93). However, in a case where a value of the notified preamble number is 0, the contention-based Random Access procedure is executed. Moreover, the non-contention based Random Access procedure is also referred to as dedicated preamble transmission.

[Uplink Data Transmission]

Uplink data transmission will be described below. The Physical Uplink Control Channel (PUCCH) is used for a response (an ACK/NACK of) to the downlink data that is transmitted on the Physical Downlink Shared Channel (PDSCH) and for transmission of wireless channel quality information (a Channel Quality Indicator (CQI)) of the downlink and a transmission request (Scheduling Request (SR)) for the uplink data. In a case where the terminal apparatus makes the transmission request for the uplink data, the terminal apparatus transmits the Scheduling Request to the base station apparatus using the Physical Uplink Control Channel (PUCCH) that is allocated by the base station apparatus.

After the transmission of the Scheduling Request, in a case where the base station apparatus allocates a resource for the Physical Uplink Shared Channel (PUSCH), the terminal apparatus transmits a Buffer Status Report (BSR) indicating a buffer status information of data that is transmitted, on the allocated resource for the Physical Uplink Shared Channel (PUSCH), by the terminal apparatus. Moreover, the base station apparatus performs uplink data scheduling on the terminal apparatus based on the Buffer Status Report.

After the transmission of the Scheduling Request, in a case where the base station apparatus does not allocate the resource for the Physical Uplink Shared Channel (PUSCH), the terminal apparatus again transmits the Scheduling Request. Although the retransmission of the Scheduling Request is iterated, in a case where the base station apparatus does not allocate the resource for the Physical Uplink Shared Channel (PUSCH), the terminal apparatus releases the Physical Uplink Control Channel (PUCCH) that is not allocated and the Uplink Reference Signal, and executes the random access procedure that is intended for the Scheduling Request. Moreover, in the Scheduling Request using the random access procedure, the terminal apparatus transmits the Buffer Status Report with message 3.

[Details of a Function of the MAC Layer]

A function of the MAC layer of the terminal apparatus will be described in more detail below. The MAC layer has a function of mapping each logical channel to the transport channel. Furthermore, the MAC layer has a function of generating transmission data from the logical channel according to a priority level. This procedure is referred to as a Logical Channel Prioritization (LCP) procedure. In the basic LCP procedure, a transmission priority level of the transmission data is determined considering a priority level of each logical channel and a Prioritized Bit Rate (PBR) that has to be transmitted within a fixed period, which corresponds to QoS of the radio bearer, and the transmission data is generated starting from data with the highest priority level at the point in time when the uplink grant is received. When making a connection to the base station apparatus, the MAC layer acquires pieces of information, such as a logical channel number of each RB, the priority level of the logical channel, and the PBR, for RRC layer.

Furthermore, the MAC layer has a function of notifying an amount of data in a transmission buffer that corresponds to each logical channel. This function is referred to as the Buffer Status Report (BSR). With the BSR, each logical channel is allocated to a Logical Channel Group (LCG), and an amount of transmission buffer for each LCG is notified, as a message of the MAC layer, to the base station apparatus.

As the BSRs, there are a regular BSR, a padding BSR, and a periodic BSR. As conditions for triggering the BSR, there are several conditions. For example, when uplink data that belongs to a certain logical channel is in a state of being able to be transmitted with a higher layer (the RLC or the PDCP), in a case where the uplink data has a higher priority level than a different logical channel, or in a case where data in the state of being able to be transmitted is not present in any one of the logical channels, the regular BSR is triggered. Furthermore, when the time check of a timer (retxBSR-Timer) expires, even in a case where the terminal apparatus has the data that is in the state of being able to be transmitted on any one of the logical channels, the regular BSR is triggered. This retxBSR-Timer is used for detecting that the BSR is not transmitted for a fixed period. Furthermore, in a case where an uplink resource that is allocated to the terminal apparatus itself has a padding region as large as is indispensable for sending some portions or all portions of the BSR, the padding BSR is triggered. Furthermore, the periodic BSR is triggered with a predetermined periodicity (a periodicity that is designated with the timer (periodic BSR-Timer)). The SR is triggered due to the triggering of the regular BSR.

Moreover, as the BSRs, there are a Short BSR in which a buffer status of one Logical Channel Group is reported, and a Long BSR in which a buffer status of multiple Logical Channel Groups is reported. Furthermore, when it comes to the padding BSR, in a case where the buffer status of the multiple Logical Channel Groups is not transmitted, if there is no padding region for transmitting the buffer status of all the Logical Channel Groups, there is also a Truncated BSR for transmitting (in the same format as for the Short BSR) a BSR of the Logical Channel Group that includes a logical channel with a high priority level.

Moreover, in a case where a condition for triggering the BSR is satisfied, if a radio resource (the Physical Uplink Share Channel (PUSCH)) for notifying the BSR is not allocated, the MAC layer is instructed to transmit the Scheduling Request (SR) to the PHY layer. After the radio resource is allocated, the MAC layer transmits the BSR. In a case where the MAC layer instructs the PHY layer to transmit the Scheduling Request, the PHY layer transmits the Scheduling Request using the Physical Uplink Control Channel (PUCCH). Moreover, in a case where the Physical Uplink Control Channel (PUCCH) for the transmission of the Scheduling Request is not allocated (is not enabled), the MAC layer instructs the PHY layer to make the Scheduling Request that uses the Physical Random Access Channel (PRACH).

Furthermore, in a case where the uplink resource for transmitting the BSR is allocated, the time check of the timer (retxBSR-Timer) is started or Restarted. Furthermore, in a case where all the BSRs to be transmitted are not the Truncated BSRs, the time check of the timer (periodicBSR-Timer) is started or Restarted.

Furthermore, in a case where uplink resource allocation can accommodate all pieces of pending data in the state of being able to be transmitted, but is not as sufficient as can accommodate the BSR and a subheader thereof, the BSRs that are all triggered are canceled. Furthermore, even in a case where the BSR is included in the MAC PDU that is transmitted, the BSRs that are all triggered are canceled.

[Primary Cell and a Secondary Cell]

Furthermore, a technology in which frequencies (component carriers or frequency bands) in multiple different frequency bands are aggregated by carrier aggregation and are handled as if they were one frequency (frequency band) may be applied to the terminal apparatus and the base station apparatus. In the carrier aggregation, as the component carriers, there are an uplink component carrier that corresponds to the uplink and a downlink component carrier that corresponds to the downlink. In the present specification, the frequency and the frequency band are used synonymously.

For example, in a case where a frequency bandwidth is obtained by aggregating five 20 MHz component carriers, the terminal apparatus that has the capability for the carrier aggregation performs transmission and reception, regarding these as a 100 MHz frequency bandwidth. Moreover, although the component carries to be aggregated are contiguous frequencies, some or all of the component carriers may be non-contiguous frequencies. For example, available frequency bands are an 800 MHz band, 2 GHz band, and a 3.5 GHz band, one component carrier may be transmitted in the 800 MHz band, one component in the 2 GHz band, and finally the third component in the 3.5 GHz band.

Furthermore, it is possible that the terminal apparatus and the base station apparatus also aggregate multiple component carriers that are the same frequency bands which are contiguous or non-contiguous. A frequency bandwidth of each component may be a frequency bandwidth (for example, 5 MHz or 10 MHz) smaller than a frequency bandwidth (for example, 20 MHz) in which the terminal apparatus is capable of performing reception, and the frequency bandwidths to be aggregated may be different from each other. It is desirable that the frequency bandwidth is equal to any one of the frequency bandwidths in a cell in the related art, considering backward compatibility, but as the frequency bandwidth, a frequency bandwidth may be used that is different from the frequency bandwidth in the cell in the related art.

With the carrier aggregation, component carriers (career types) may be aggregated that do not have the backward compatibility. The component carrier that does not have the backward compatibility is also referred to as a new component type (NCT). Moreover, it is desirable that the number of uplink component carriers that are allocated to (configured for or added to) the terminal apparatus by the base station apparatus is equal to or smaller than the number of downlink component carriers.

The terminal apparatus and the base station apparatus manage as a Primary Cell (PCell) a cell that is constituted from downlink component carriers which are connected, in a cell-specific manner, to a certain uplink component carrier and the uplink component carrier. Furthermore, the terminal apparatus and the base station apparatus manage as a Secondary cell (SCell) a cell that is constituted from component carriers other than those from which the primary cell is constituted.

The terminal apparatus may perform reception of a paging message, detection of update of the broadcast information, an initial access procedure, configuration of security information, and the like in the Primary Cell, and on the other hand, may not perform these operations in the Secondary Cell. The Primary Cell and the Secondary Cell are collectively referred to as serving cells.

The Primary Cell is other than a target for control of Activation and Deactivation (more precisely, the Primary Cell is regarded as being necessarily activated), but the Secondary Cell retains a state of the cell, in accordance with activities, the Activation and the Deactivation. With regard to a state of the cell, a state where the serving cell is activated is also referred to as an Activated state, and a state where the serving cell is deactivated is also referred to as a Deactivated state. The state of the cell (the Secondary Cell) is also a case where a change of the state is explicitly designated (notified or indicated) by the base station apparatus, or is also a case where the state is changed based on timer information (a deactivation timer (a secondary cell deactivation timer)) that is counted by the terminal apparatus for every component carrier (Secondary Cell).

[D2D Communication]

A mechanism (ProSe Didcovery), as a service between the terminal apparatuses in proximity to each other (Proximity based Services (ProSe)), for checking (discovering) even during the D2D communication whether or not the terminal apparatuses are located close to each other, and a mechanism (ProSe Communication) for the terminal apparatus to perform communication without involving the base station apparatus are mainly considered.

Even in a state (RRC_CONNECTED state) in which wireless connection to the base station apparatus is established, and even in a state (RRC_IDLE state) in which the wireless connection to the base station apparatus is not established, transmission of ProSe Discovery message has to be performed.

Furthermore, even in a case where a signal or a message is transmitted between the terminal apparatuses, the transmission by the terminal apparatus may be under the control of a network. That is, although the terminal apparatus is in a non-wireless connection state, the network may be able to control a radio resource or a parameter for transmitting a ProSe Discovery signal or message, or a state (a wireless connection state or a non-wireless connection state) at the time of the transmission.

In ProSe Communication (device-to-device data communication), in a case where the communication is performed with group casting or broadcasting, a step of discovering a communication partner with ProSe Discovery is not necessarily indispensable.

Various ProSe Communication signals are considered, and a Physical Channel that has the same structure as EUTRA and the PUSCH may be used.

Furthermore, in the ProSe Communication, a resource for receiving Scheduling assignments (SA) is provided, as a resource that is to be used by the terminal apparatus, to the terminal apparatus. The terminal apparatus determines the presence or absence of data that is destined for the terminal apparatus itself, by receiving the SA in resources (the time and the frequency) that are designated as a resource pool. The resource pool may be configured in advance, be notified (broadcast) by the base station apparatus, and be notified (broadcast) by a different station apparatus.

In addition, as a method for the terminal apparatus to transmit the above-described SA, a method in which the terminal apparatus makes the transmission request to the base station apparatus, and in response to this, a transmission resource is allocated (which is hereinafter also referred to as Mode 1 or a scheduled type (Scheduled)), or a method in which the terminal apparatus uses as the transmission resource the broadcast information or a resource that is configured in advance (which is hereinafter also referred to Mode 2 or an autonomous type (Autonomous)) may be used.

In the ProSe Communication, in a case where one-to-M (M is a natural number) broadcasting communication is used, other multiple terminal apparatuses can receive a signal that is transmitted by a certain terminal apparatus, and it is possible that the terminal apparatus which performs the transmission and the terminal apparatus which performs the reception exchanges their roles. Furthermore, in the case of the purpose of public safety, the broadcasting communication needs to be performed even out of coverage by the base station apparatus. Furthermore, the broadcasting communication supports both of a dedicated frequency (Dedicated carrier) and a frequency that is used for a normal communication service in which the base station apparatus is involved. Furthermore, because the broadcasting communication is one-way communication, feedback with a layer 2 (the MAC/RLC/PDCP layer) is not assumed. That is, the communication is performed in an Unacknowledge Mode (UM) in which error correction using ARQ is not performed in the RLC layer, without performing retransmission control using the HARQ in the MAC layer. In the case of one-to-one communication, it is also considered that the above-described one-to-M broadcasting communication is applied (M=1), and it is also considered that the feedback with the layer 2 is performed by performing unicasting communication.

Considering the above-described matters, a suitable embodiment of the present invention will be described in detail below referring to the accompanying drawings. Moreover, when the embodiment of the present invention is described, in a case where it is determined that a specific description of a known function or constitution associated with the embodiment of the present invention makes the gist of the embodiment of the present invention indefinite, a detailed description thereof is omitted.

First Embodiment

A first embodiment of the present invention will be described in detail below.

FIG. 1 is a block diagram illustrating one example of a terminal apparatus 1 according to the first embodiment of the present invention. The present terminal apparatus 1 is constituted at least from a reception unit 101, a demodulation unit 102, a decoding unit 103, a reception data control unit 104, a physical layer control unit 105, a transmission data control unit 106, a coding unit 107, a modulation unit 108, a transmission unit 109, and a radio resource control unit 110. The "units" in the drawings are elements that are also expressed using the terms circuit, constituent element, device, unit, and the like and that realize a function of the terminal apparatus 1 and each procedure.

The radio resource control unit 110 is a block that performs each function of the Radio Resource Control (RRC) layer that executes Radio Resource Control of the terminal apparatus 1. Furthermore, the reception data control unit 104 and the transmission data control unit 106 are blocks that perform each function in the Medium Access Control (MAC) layer that manages the data link layer, the Radio Link Control (RLC) layer, and the Packet Data Convergence Protocol (PDCP) layer.

Moreover, the terminal apparatus 1 may be constituted to include some or all of blocks (the reception unit 101, the demodulation unit 102, and the decoding unit 103) in a reception system, and multiple frequencies (frequency bands and frequency bandwidths) and blocks (the coding unit 107, the modulation unit 108, and the transmission unit 109) in a transmission system, in order that, by using the carrier aggregation and/or the device-to-device communication, transmission and reception processing at multiple frequencies (frequency bands and frequency bandwidths) or within the same subframe of a cell is supported.

With regard to reception processing by the terminal apparatus 1, reception data control information is input from the radio resource control unit 110 into the reception data control unit 104, and physical layer control information that is a control parameter for controlling each block is input into the physical layer control unit 105. The physical layer control information is information that is constituted from reception control information and transmission control information and that includes a parameter configuration indispensable for wireless communication control by the terminal apparatus 1.

The physical layer control information is configured by a wireless connection resource configuration that is transmitted in a dedicated manner from a base station apparatus 2 to the terminal apparatus 1, cell-specific broadcast information, a system parameter, or the like, and, if need arises, is input by the radio resource control unit 110 into the physical layer control unit 105. The physical layer control unit 105 suitably input the reception control information, which is control information relating to the reception, to the reception unit 101, the demodulation unit 102, and the decoding unit 103.

Included in the reception control information are pieces of information, as downlink scheduling information, such as reception frequency band information, reception timing relating to the Physical Channel and the physical signal, a multiplexing method, and radio resource control information. Furthermore, the reception data control information is downlink control information that includes secondary cell deactivation timer information, DRX control information, multicast data reception information, downlink retransmission control information, and the like. Additionally, control information relating to the downlink in each of the MAC layer, the RLC layer, and the PDCP layer is included in the reception data control information.

The reception signal is received in the reception unit 101. The reception unit 101 receives a signal from the base station apparatus 2 in accordance with the frequency and the frequency band that are notified with the reception control information. The signal that is received is input into the demodulation unit 102. The demodulation unit 102 performs demodulation of the signal. The demodulation unit 102 input a post-demodulation signal into the decoding unit 103. The decoding unit 103 decodes the signal that is input, and inputs each piece of data (which is also referred to as downlink data, downlink control data, or a downlink transport block) that results from the decoding, into the reception data control unit 104. Furthermore, along with each piece of data, a MAC control element that is transmitted from the base station apparatus 2 is decoded in the decoding unit 103 as well, and related data is input into the reception data control unit 104.

The reception data control unit 104 performs control (for example, cell activation/deactivation, DRX control, transmission timing adjustment, and the like) of the physical layer control unit 105, which is based on the received MAC control element, performs buffering of each piece of data that results from the decoding, and performs error correction control (HARQ) of data that is retransmitted. Each piece of data that is input into the reception data control unit 104, that is, related data is input into (transferred to) the radio resource control unit 110.

With regard to transmission processing by the terminal apparatus 1, transmission data control information is input from the radio resource control unit 110 into the transmission data control unit 106, and the physical layer control information that is a control parameter for controlling each block is input into the physical layer control unit 105. The physical layer control unit 105 suitably inputs the transmission control information that is control information relating to the transmission, into the coding unit 107, the modulation unit 108, and the transmission unit 109. Included in the transmission control information are pieces of information, as uplink scheduling information, such as coding information, modulation information, transmission frequency band information, transmission timing relating to the physical channel and the physical signal, the multiplexing method, and the radio resource arrangement information.

Furthermore, the transmission data control information is uplink control information that includes DTX control information, the random access configuration information, uplink shared channel information, logical channel priority information, resource request configuration information, cell group information, uplink retransmission control information, and the Buffer Status Report. The radio resource control unit 110 may configure multiple pieces of random access configuration information that correspond to multiple cells, respectively, for the transmission data control unit 106.

Furthermore, the radio resource control unit 110 manages the transmission timing adjustment information and the transmission timing timer that are used for adjustment of the uplink transmission timing, and manages an uplink transmission timing state (a transmission timing adjusted state or a transmission unadjusted state) for every cell (every cell group or every TA group). The transmission timing adjustment information and the transmission timing timer is included in the transmission data control information.

Moreover, in a case where there is a need to manage multiple uplink transmission timing states, the transmission data control unit 106 manages the transmission timing adjustment information that corresponds to the uplink transmission timing in each of the multiple cells (the cell group or the TA group). Included in the resource request configuration information are at least maximum transmission counter configuration information and radio resource request prohibition timer information. The radio resource control unit 110 may configure multiple pieces of resource request configuration information that correspond to multiple cells, respectively, in the transmission data control unit 106.

The transmission data (which is also referred to as the uplink data, the uplink control data, and an uplink transport block) that are originated in the terminal apparatus 1 are input from the radio resource control unit 110 into the transmission data control unit 106 at an arbitrary timing. At this time, the transmission data control unit 106 calculates an amount of the transmission data (an amount of uplink buffer) that is input. Furthermore, the transmission data control unit 106 has a function of determining whether the transmission data that is input is data that belongs to the Control-plane or is data that belongs to the User-plane. Furthermore, the transmission data control unit 106 has a function of determining whether the transmission data that is input is data for the base station apparatus 2 or data for device-to-device communication.

Furthermore, when the transmission data is input, the transmission data control unit 106 stores the transmission data in an uplink buffer (not illustrated) within the transmission data control unit 106. Then, the transmission data control unit 106 determines whether or not the radio resource indispensable for the transmission of the transmission data that is input is allocated to the terminal apparatus 1. The transmission data control unit 106 selects any one of the radio resource request that uses the Physical Uplink Shared Channel (PUSCH) and the Physical Uplink Control Channel (SR-PUCCH) and the radio resource request that uses the Physical Random Access Channel, based on radio resource allocation, and makes a request to the physical layer control unit 105 for control processing for transmitting the selected channel.

Furthermore, in a case where the transmission data that is input is data for the device-to-device communication, the transmission data control unit 106 generates the Buffer Status Report that includes identifier information for identifying which service data or which application data the transmission data is, and an index indicating a buffer size level. Furthermore, in accordance with the transmission control information, the coding unit 107 suitably codes each piece of data and inputs a result of the coding into the modulation unit 108.

Based on a channel structure in which each piece of coded data is transmitted, the modulation unit 108 performs suitable modulation processing. Along with mapping each piece of data being modification-processed to the frequency domain, the transmission unit 109 converts a signal in the frequency domain into a signal in the time domain, impresses the resulting signal on a carrier wave in a fixed frequency, and performs power amplification. In accordance with the transmission timing adjustment information for every cell (every cell group or every TA group), which is input from the radio resource control unit 110, the transmission unit 109 further adjusts the uplink transmission timing. It is possible that the Physical Uplink Shared Channel to which the uplink control data is mapped also include, for example, the layer 3 message (a radio resource control message (RRC message)) in addition to the user data.

Other constituent elements of the terminal apparatus 1 and a transfer path for data (the control information) between the constituent elements are omitted in FIG. 1, but it is apparent that multiple blocks that have other functions indispensable for the terminal apparatus 1 to operate are retained as constituent elements. For example, a NAS layer unit that, along with a core network, executes control, or an application layer unit is present above the radio resource control unit 110.

Figure 2:
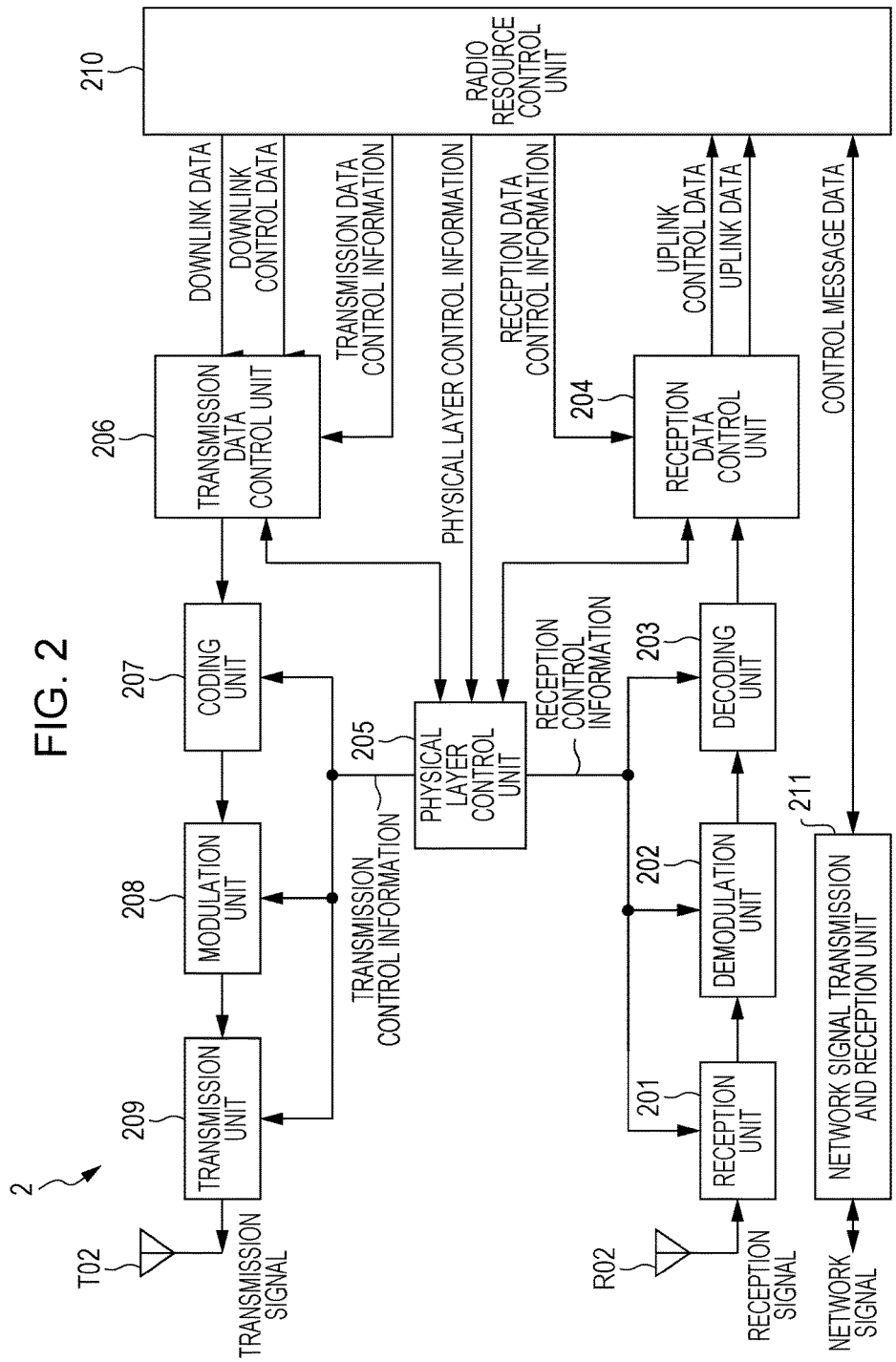
FIG. 2 is a block diagram illustrating one example of a schematic constitution of a base station apparatus according to the embodiment of the present invention.

FIG. 2 is a block diagram illustrating one example of the base station apparatus 2 according to the first embodiment of the present invention. The present base station apparatus is constituted at least from a reception unit 201, a demodulation unit 202, a decoding unit 203, a reception data control unit 204, a physical layer control unit 205, a transmission data control unit 206, a coding unit 207, a modulation unit 208, a transmission unit 209, a radio resource control unit 210, and a network signal transmission and reception unit 211. The "units" in the drawings are elements that are also expressed using the terms circuit, constituent element, device, unit, and the like and that perform a function of the base station apparatus 2 and execute each procedure.

The radio resource control unit 210 is a block that performs each function of the Radio Resource Control (RRC) layer that executes the Radio Resource Control of the base station apparatus 2. Furthermore, the reception data control unit 204 and the transmission data control unit 206 are blocks that perform each function in the Medium Access Control (MAC) layer that manages the data link layer, the Radio Link Control (RLC) layer, and the Packet Data Convergence Protocol (PDCP) layer.

Moreover, the base station apparatus 2 may be constituted to include some or all of blocks (the reception unit 201, the demodulation unit 202, and the decoding unit 203) in a reception system, and multiple frequencies (frequency bands and frequency bandwidths) and blocks (the coding unit 207, the modulation unit 208, and the transmission unit 209) in a transmission system, in order that, by using the carrier aggregation and the like, the transmission and reception processing at multiple frequencies (frequency bands and frequency bandwidths) or within the same subframe of a cell is supported.

The radio resource control unit 210 inputs the downlink data and the downlink control data into the transmission data control unit 206. In a case where the MAC control element that is to be transmitted to the terminal apparatus 1 is present, the transmission data control unit 206 inputs the MAC control element and each piece of data (the downlink data or the downlink control data) into the coding unit 207. The coding unit 207 codes the MAC control element and each piece of data, which are input, and inputs results of the coding into the modulation unit 208. The modulation unit 208 performs modulation of the coded signal.

Furthermore, the signal that is modulated in the modulation unit 208 is input into the transmission unit 209. After mapping each piece of data being input to the frequency domain, the transmission unit 209 converts a signal in the frequency domain into a signal in the time domain, impresses the resulting signal on a carrier wave in the fixed frequency, performs the power amplification, and performs the transmission. The Physical Downlink Shared Channel to which the downlink control data is mapped typically constitutes the layer 3 message (the RRC message).

Furthermore, the reception unit 201 converts the signal that is received from the terminal apparatus 1 into a digital signal in a baseband. In a case where cells at multiple different transmission timings are configured for the terminal apparatus 1, the reception unit 201 receives the signal at different timings for every cell (every cell group or every TA group). The digital signal that results from the conversion in the reception unit 201 is input into the demodulation unit 202 and is demodulated. The signal that results from the demodulation in the demodulation unit 202 is subsequently input into the decoding unit 203. The decoding unit 203 decodes the signal that is input, and inputs each piece of data (the uplink data and the uplink control data) that results from the decoding, into the reception data control unit 204. Furthermore, along with each piece of data, the MAC control element that is transmitted from the terminal apparatus 1 is decoded in the decoding unit 203 as well, and related data is input into the reception data control unit 204.

The reception data control unit 204 performs control (for example, control relating to a power headroom report, control relating to the Buffer Status Report, or the like) of the physical layer control unit 205, which is based on the received MAC control element, performs buffering of each piece of data that results from the decoding, and performs the error correction control (HARQ) of data that is retransmitted. Each piece of data that is input into the reception data control unit 204 is input into (transferred to) the radio resource control unit 210.

Furthermore, in a case where the Buffer Status Report from the terminal apparatus 1 is input, as a transmission resource request for the purpose of the device-to-device data communication, from the decoding unit 203, the reception data control unit 204 inputs the identifier information that is included in the Buffer Status Report, into the transmission data control unit 206, and configures the transmission resource that is to be allocated to the terminal apparatus 1, from a resource that is associated with the identifier information by a higher-level network apparatus or a system parameter.

The physical layer control information that is indispensable for these type of control of each block is information that is constituted from reception control information and transmission control information and that includes a parameter configuration indispensable for wireless communication control by the base station apparatus 2. The physical layer control information is configured by the higher-level network apparatus (an MME, a gateway apparatus (SGW), an OAM, or the like) or the system parameter, and, if need arises, is input by the radio resource control unit 210 into the control unit 204.

The physical layer control unit 205 inputs the physical layer control information associated with the transmission, as the transmission control information, into each block, that is, the coding unit 207, the modulation unit 208, and the transmission unit 209, and suitably inputs the physical layer control information associated with the reception, as the reception control information, into each block, that is, the reception unit 201, the demodulation unit 202, and the decoding unit 203.

The control information relating to the uplink, of the terminal apparatus 1 for each of the MAC layer, the RLC layer, and the PDCP layer of the base station apparatus 2 is included in the reception data control information. Furthermore, the control information relating to the downlink, of the terminal apparatus 1 for each of the MAC layer, the RLC layer, and the PDCP layer of the base station apparatus 2 is included in the transmission data control information. That is, the reception data control information and transmission data control information are configured for every terminal apparatus 1.

The network signal transmission and reception unit 211 performs the transmission (transfer) or reception of a control message between the base station apparatuses 2 or between the higher-level network apparatus (the MME or the SGW) and the base station apparatus 2, or of the user data. Other constituent elements of the base station apparatus 2 and the transfer path for data (the control information) between the constituent elements are omitted in FIG. 2, but it is apparent that multiple blocks that have other functions indispensable for the base station apparatus 2 to operate are retained as constituent elements. For example, a Radio Resource Management unit or an application layer unit is present over the radio resource control unit 210.

Figure 3:
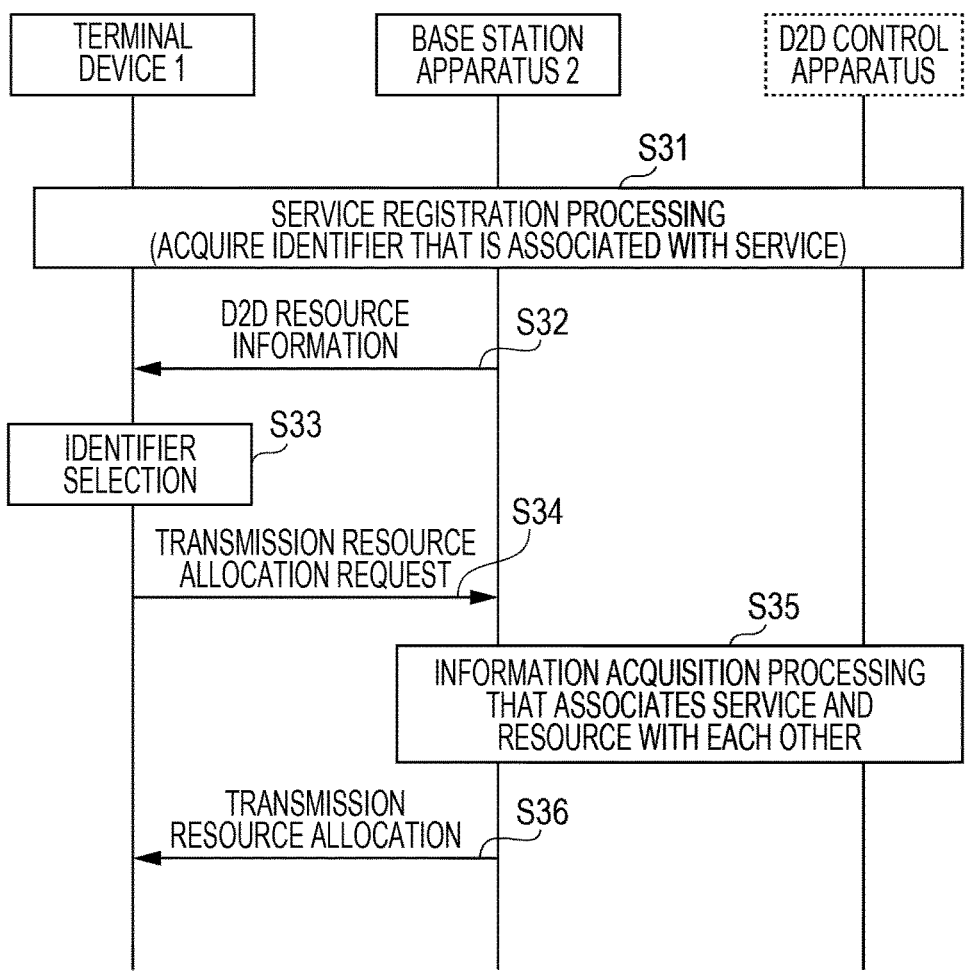
FIG. 3 is a sequence chart illustrating one example relating to acquisition of a transmission resource for device-to-device data communication according to a first embodiment of the present invention.

Next, one example of a procedure in which the terminal apparatus 1 acquires the transmission resource for the device-to-device data communication from the base station apparatus 2 is described referring to FIG. 3.

Moreover, according to the present embodiment, a D2D control apparatus is described as one apparatus, but no limitation to this is imposed. A function of the D2D control apparatus may be mounted into various apparatuses (for example, the base station apparatus, the MME, the gateway apparatus, or the like) on the network, and multiple function of the D2D control apparatus may be built into different apparatuses, respectively. Furthermore, the function of the D2D control apparatus may be built into different apparatuses for every service or application for the device-to-device communication.

In FIG. 3, the terminal apparatus 1 that performs the device-to-device data communication requests the D2D control apparatus to register to a service of performing the device-to-device data communication, and acquires information indispensable for the device-to-device data communication from the D2D control apparatus (Step S31). The pieces of information, for example, include an identifier that is associated with a single service or application, an identifier that is associated with a group of multiple services or applications, identifiers for identifying multiple groups that result from dividing the single service or application, and the like. Furthermore, the pieces of information, for example, may include information, that is, an identifier for identifying a transmission source and/or a destination of the device-to-device data communication. Furthermore, the pieces of information, for example, may include information, that is, an identifier indicating a service area in which the device-to-device data communication is performed or a frequency at which the data communication is performed. Alternatively, when it comes to the terminal apparatus 1, the information may be dynamically configured to be within the terminal apparatus 1 itself, and in a case where the information is once acquired, the terminal apparatus 1 may start the time check of the timer that counts a fixed time, and may acquire the information again when the timer expires.

The terminal apparatus 1 that performs a reception operation in the device-to-device data communication acquires D2D resource information from the base station apparatus 2 (Step S32), and receives the Scheduling Assignment that is transmitted from the terminal apparatus 1 that performs a different transmission operation with a D2D resource. In the device-to-device data communication, pieces of D2D resource information include information indicating a reception resource (the frequency and the time) for receiving the Scheduling Assignment (SA) that is transmitted by the terminal apparatus 1 on the transmission side, information indicating the transmission resource (the frequency and the time) in which the terminal apparatus 1 on the transmission side can autonomously perform the transmission, and the like.

The terminal apparatus 1 that performs the transmission operation in the device-to-device data communication selects the identifier that is acquired in Step S31 (Step S33), and notifies the base station apparatus 2 of the identifier information (the identifier, an index number that is associated in advance with multiple identifiers that are configured for the terminal apparatus 1, or the like), in a state of being attached to a transmission resource allocation request message (Step S34).

As the transmission resource allocation request message, for example, the Buffer Status Report of the MAC layer may be used, and the transmission resource allocation request message may be signaling of a different MAC layer or a message of the RRC layer. In a case where the transmission resource allocation request message is the Buffer Status Report, in order to include the identifier information in the Buffer Status Report, a different logical channel identifier from a logical channel identifier (LCID) of the Buffer Status Report in the related art may be used. Furthermore, the Buffer Status Report includes the identifier information and the index indicating the buffer size level. Furthermore, the Buffer Status Report may include multiple services or a buffer status of an application. That is, one Buffer Status Report may include multiple pieces of identifier information and an index indicating each buffer size level. Furthermore, in a case where different signaling or a different message is used, at least the identifier information is included.

Based on the notified identifier information, the base station apparatus 2 that receives the transmission resource allocation request message acquires a service that is used by the terminal apparatus 1 or resource information that is used by the application, from the D2D control apparatus (Step S35). For example, when the base station apparatus 2 performs communication with the terminal apparatus 1 using multiple frequency cells, based on the identifier information that is notified by the terminal apparatus 1 and frequency information that is associated with the service or the application which is acquired from the D2D control apparatus, the base station apparatus 2 can determine for which cell (frequency) a resource that is requested is, and accordingly can select the resource. Moreover, Step S35 may be performed earlier than Step S34. That is, based on the identifier that is acquired in advance and the information that is associated with the frequency information, the base station apparatus 2 may determine the resource that is requested by the terminal apparatus 1. Furthermore, in a case where the terminal apparatus 1 requests a resource (a frequency) for a cell other than the cell (the frequency) that is controlled by the base station apparatus 2 itself, the base station apparatus 2 may cause the terminal apparatus 1 to perform a handover to a cell of the base station apparatus 2 that controls the resource for the cell (frequency).

The base station apparatus 2 determines the transmission resource that is to be allocated to the terminal apparatus 1, from the resource that is selected in Step S34, and notifies the terminal apparatus 1 of the determined transmission resource (Step S36).

With this configuration, at the time of the transmission resource request, the terminal apparatus 1 can notify the base station apparatus 2 of the identifier information for identifying which service or which application the data communication is for, and based on the notified identifier information, the base station apparatus 2 can select the transmission resource to be allocated.

According to the first embodiment, at the time of the transmission resource request, the terminal apparatus 1 notifies the base station apparatus 2 of the identifier information for identifying which service or which application the data communication is for, and, based on the notified identifier information, the base station apparatus 2 selects the transmission resource to be allocated. Thus, for example, even in a case the communication is performed using multiple cells with the carrier aggregation or the like, even in a case where a frequency for specific communication other than a frequency for normal communication is secured, and even in a case where the resource that differs from one service to another or from one application to another is used, the allocation of a suitable transmission resource is possible. Furthermore, even in a case where the terminal apparatus 1 performs a communication service among multiple devices, the allocation of the suitable transmission resource is possible. Furthermore, based on an amount of delay, a bit rate, or the like that is requested by the service or the application which corresponds to the identifier information, the application of the suitable transmission resource is possible.

Second Embodiment

A second embodiment of the present invention will be described.

According to the first embodiment, the example is described in which the terminal apparatus 1 notifies the base station apparatus 2 of the identifier and the transmission resource that is used by the base station apparatus 2 is determined.

According to the present embodiment, an example is described in which it is explicitly indicated which resource the terminal apparatus 1 wants.

The terminal apparatus 1 and the base station apparatus 2 according to the present embodiment have the transmission data control unit 106, and the reception data control unit 204 and the transmission data control unit 206, respectively, which are different in operation from those according to the first embodiment. Thus, detailed descriptions of features other than this are omitted.

According to the present embodiment, in the case where the transmission data that is input is the data for the device-to-device communication, the transmission data control unit 106 generates the Buffer Status Report that includes the frequency information indicating on which cell (frequency) resource the transmission data that is data for a service or an application is transmitted, and the index indicating the buffer size level.

Furthermore, according to the present embodiment, in the case where the Buffer Status Report from the terminal apparatus 1 is input, as the transmission resource request for the purpose of the device-to-device data communication, from the decoding unit 203, the reception data control unit 204 inputs the frequency information that is included in the Buffer Status Report, into the transmission data control unit 206. The transmission data control unit 206 configures the transmission resource that is to be allocated to the terminal apparatus 1, from the resource that is indicated with the frequency information.

Figure 4:
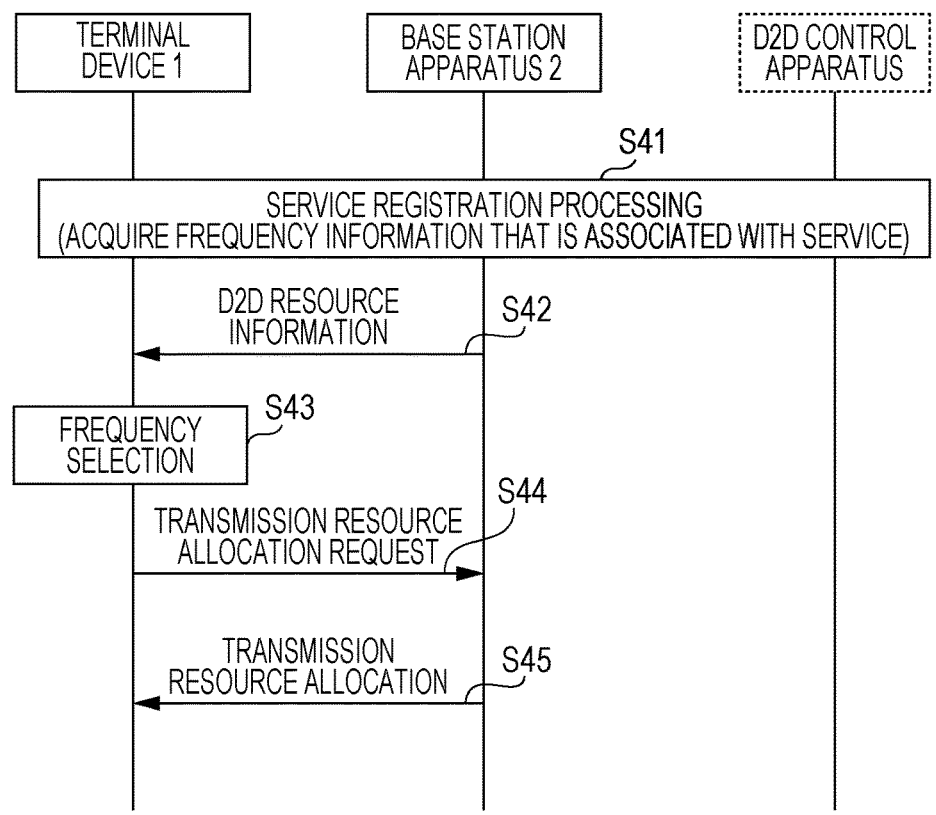
FIG. 4 is a sequence chart illustrating one example relating to acquisition of a transmission resource for device-to-device data communication according to a second embodiment of the present invention.

Next, according to the present embodiment, one example of a procedure in which the terminal apparatus 1 acquires the transmission resource for the device-to-device data communication from the base station apparatus 2 is described referring to FIG. 4.

Moreover, according to the present embodiment, a D2D control apparatus is described as one apparatus, but no limitation to this is imposed. A function of the D2D control apparatus may be mounted into various apparatuses (for example, the base station apparatus, the MME, the gateway apparatus, or the like) on the network, and multiple function of the D2D control apparatus may be built into different apparatuses, respectively. Furthermore, the function of the D2D control apparatus may be built into different apparatuses for every service or application for the device-to-device communication.

In FIG. 4, the terminal apparatus 1 that performs the device-to-device data communication requests the D2D control apparatus to register to the service of performing the device-to-device data communication, and acquires the information indispensable for the device-to-device data communication from the D2D control apparatus (Step S41). The pieces of information, for example, include the identifier that is associated with a single service or application, the identifier that is associated with a group of multiple services or applications, the identifiers for identifying multiple groups that result from dividing the single service or application, and the like. Furthermore, the pieces of information include information (the frequency information) indicating the service area or the frequency for each service or every application that is used for the device-to-device data communication. Furthermore, the pieces of information, for example, may include information, that is, an identifier for identifying a transmission source and/or a destination of the device-to-device data communication. Alternatively, when it comes to the terminal apparatus 1, the information may be dynamically configured to be within the terminal apparatus 1 itself, and in the case where the information is once acquired, the terminal apparatus 1 may start the time check of the timer that counts a fixed time, and may acquire the information again when the timer expires.

The terminal apparatus 1 that performs the reception operation in the device-to-device data communication acquires the D2D resource information from the base station apparatus 2 (Step S42), and receives the Scheduling Assignment that is transmitted from the terminal apparatus 1 that performs a different transmission operation with the D2D resource. In the device-to-device data communication, pieces of D2D resource information include information indicating a reception resource (the frequency and the time) for receiving the Scheduling Assignment (SA) that is transmitted by the terminal apparatus 1 on the transmission side, information indicating the transmission resource (the frequency and the time) in which the terminal apparatus 1 on the transmission side can autonomously perform the transmission, and the like.

The terminal apparatus 1 that performs the reception operation in the device-to-device data communication selects a frequency that is requested based on the frequency information (which is acquired in Step S41) that corresponds to the service or the application to which the data to be transmitted belongs (Step S43), and notifies the base station apparatus 2 of the frequency information in a state of being attached to the transmission resource allocation request message (Step S44).

As the transmission resource allocation request message, for example, the Buffer Status Report of the MAC layer may be used, and the transmission resource allocation request message may be signaling of a different MAC layer or a message of the RRC layer. In the case where the transmission resource allocation request message is the Buffer Status Report, in order to include the frequency information in the Buffer Status Report, a different logical channel identifier from a logical channel identifier (LCID) of the Buffer Status Report in the related art may be used. Furthermore, the Buffer Status Report includes the frequency information and the index indicating the buffer size level. Furthermore, the frequency information may be a cell index (information for uniquely identifying a cell that is configured for the terminal apparatus 1) that is configured for the carrier aggregation and the like, and may be an identifier (an index) that is associated with each of the multiple pieces of release information that is broadcast (or notified) by the base station apparatus 2. Furthermore, in the case where different signaling or a different message is used, at least the identifier information is included.

Based on the notified frequency information, the base station apparatus 2 that receives the transmission resource allocation request message determines the transmission resource that is to be allocated to the terminal apparatus 1 and notifies the terminal apparatus 1 of the determined transmission resource (Step S45). For example, when the base station apparatus 2 performs the communication with the terminal apparatus 1 using the multiple frequency cells, based on the frequency information that is notified by the terminal apparatus 1, the base station apparatus 2 can determine for which cell (frequency) a resource that is requested is, and accordingly can select the resource. Moreover, in the case where the terminal apparatus 1 requests a resource for a cell (a frequency) other than the cell (the frequency) that is controlled by the base station apparatus 2 itself, the base station apparatus 2 may cause the terminal apparatus 1 to perform the handover to the cell of the base station apparatus 2 that controls the resource for the cell (frequency).

With this configuration, at the time of the transmission resource request, the terminal apparatus 1 can notify the base station apparatus 2 of the frequency information based on which service data or which application data the data that is transmitted by the terminal apparatus 1 itself is, the terminal apparatus 1 can notify the base station apparatus 2 of the frequency information, and, based on the notified frequency information, the base station apparatus 2 can select the transmission resource to be allocated.

According to the second embodiment, at the time of the transmission resource request, based on which service data or which application data the data that is transmitted by the terminal apparatus itself is, the terminal apparatus 1 notifies the base station apparatus 2 of the frequency information, and, based on the notified frequency information, the base station apparatus 2 selects the transmission resource to be allocated. Thus, for example, even in the case the communication is performed using multiple cells with the carrier aggregation or the like, even in the case where the frequency for the specific communication other than the frequency for the normal communication is secured, and even in the case where the resource that differs from one service to another or from one application to another is used, the allocation of the suitable transmission resource is possible. Furthermore, even in the case where the terminal apparatus 1 performs a communication service among multiple devices, the allocation of the suitable transmission resource is possible.

Third Embodiment

A third embodiment of the present invention will be described below.

According to the first embodiment and the second embodiment, the example is described in which at the time of the transmission resource request, it is determined which resource is used.

According to the present embodiment, an example is described in which the terminal apparatus 1 notifies the base station apparatus 2 of information relating to a resource that is used when using a function of performing the device-to-device communication.

The terminal apparatus 1 and the base station apparatus 2 that are used according to the present embodiment have transmission data control unit 106 and the radio resource control unit 110, and the reception data control unit 204, the transmission data control unit 206, and the radio resource control unit 210, respectively, which are different in operation from those according to the first embodiment. Thus, detailed descriptions of features other than this are omitted.

According to the present embodiment, when starting the device-to-device data communication, based on information on a resource that is used for the device-to-device data communication, which is included in the broadcast information that is input from the reception data control unit 104 or in control data, and on in-use frequency information that is configured from the D2D control apparatus (or that is configured on the terminal apparatus 1), the radio resource control unit 110 generates a device-to-device data communication starting request message that includes information (an identifier, an index, or the like that is configured for a resource, with the broadcast information or the control data, from the base station apparatus 2) on a resource that the terminal apparatus 1 itself wants to use for the device-to-device data communication.

Furthermore, according to the present embodiment, in a case where the transmission data that is input from the radio resource control unit 110 is data for the device-to-device communication, the transmission data control unit 106 generates the Buffer Status Report that includes the identifier information indicating which resource the transmission data wants to be transmitted on, which is included in the device-to-device data communication starting request message, and the index indicating the buffer size level.

Furthermore, according to the present embodiment, the radio resource control unit 210 inputs into the transmission data control unit 206 an identifier that is included in an device-to-device communication starting request message which is input from the reception data control unit 204, and resource information that corresponds to the identifier which is included in the device-to-device communication starting request message, among resources that are used for the device-to-device data communication, which are broadcast (notified) to the terminal apparatus 1, as the broadcast information or the control data, to the terminal apparatus.

Furthermore, according to the present embodiment, in the case where the Buffer Status Report from the terminal apparatus 1 is input, as the transmission resource request for the purpose of the device-to-device data communication, from the decoding unit 203, the reception data control unit 204 inputs the identifier information that is included in the Buffer Status Report, into the transmission data control unit 206. The transmission data control unit 206 acquires the resource information that is associated with the identifier information, from the radio resource control unit 210, and configures the transmission resource that is to be allocated to the terminal apparatus 1.

Figure 5:
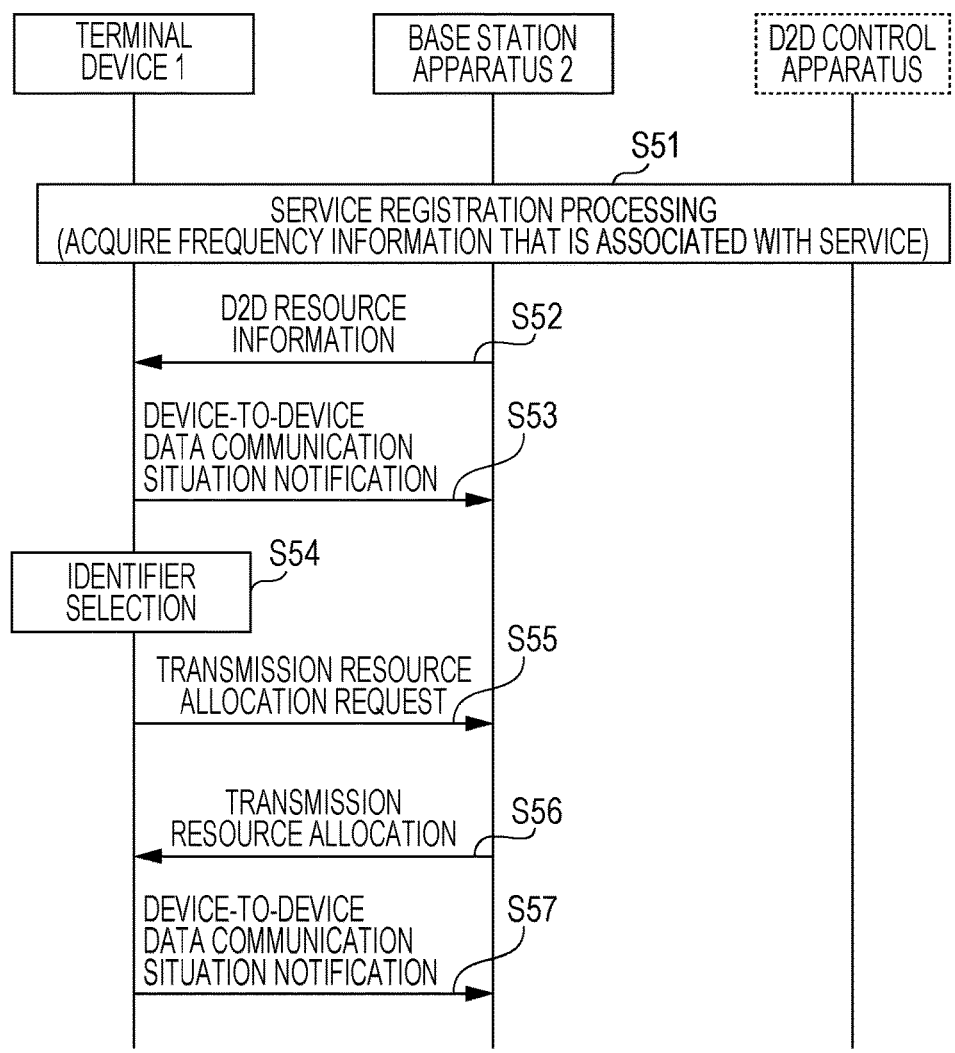
FIG. 5 is a sequence chart illustrating one example relating to acquisition of a transmission resource for device-to-device data communication according to a third embodiment of the present invention.

Next, one example of a procedure in which the terminal apparatus 1 acquires the transmission resource for the device-to-device data communication from the base station apparatus 2 is described referring to FIG. 5.

Moreover, according to the present embodiment, the D2D control apparatus is described as one apparatus, but no limitation to this is imposed. The function of the D2D control apparatus may be mounted into various apparatuses (for example, the base station apparatus, the MME, the gateway apparatus, or the like) on the network, and the multiple functions of the D2D control apparatus may be built into different apparatuses, respectively. Furthermore, the function of the D2D control apparatus may be built into different apparatuses for every service or application for the device-to-device communication.

In FIG. 5, the terminal apparatus 1 that performs the device-to-device data communication requests the D2D control apparatus to register to the service of performing the device-to-device data communication, and acquires information indispensable for the device-to-device data communication from the D2D control apparatus (Step S51). The pieces of information, for example, include the identifier that is associated with a single service or application, the identifier that is associated with a group of multiple services or applications, the identifiers for identifying multiple groups that result from dividing the single service or application, and the like. Furthermore, the pieces of information include the information, that is, the identifier indicating the service area in which the device-to-device data communication is performed or the frequency at which the data communication is performed. Furthermore, the pieces of information, for example, may include information, that is, an identifier for identifying a transmission source and/or a destination of the device-to-device data communication. Alternatively, when it comes to the terminal apparatus 1, the information may be dynamically configured to be within the terminal apparatus 1 itself, and in the case where the information is once acquired, the terminal apparatus 1 may start the time check of the timer that counts a fixed time, and may acquire the information again when the timer expires.

The terminal apparatus 1 that performs the reception operation in the device-to-device data communication acquires the D2D resource information from the base station apparatus 2 (Step S52), and receives the Scheduling Assignment that is transmitted from the terminal apparatus 1 that performs a different transmission operation with the D2D resource. In the device-to-device data communication, pieces of D2D resource information include information indicating a reception resource (the frequency and the time) for receiving the Scheduling Assignment (SA) that is transmitted by the terminal apparatus 1 on the transmission side, information indicating the transmission resource (the frequency and the time) in which the terminal apparatus 1 on the transmission side can autonomously perform the transmission, and the like.

The terminal apparatus 1 that wants to perform the device-to-device data communication selects the frequency that is requested based on the frequency information (which is acquired in Step S51) that corresponds to the service or the application, and notifies the base station apparatus 2 of the frequency information in a state of being included in a device-to-device data communication status notification message (Step S53).

Moreover, the frequency information may be broadcast information for broadcasting the resource that is used for the device-to-device data communication, or information for identifying multiple resources, which is included in notification information that is notified in a dedicated manner, be an identifier or an index that is included in the broadcast information or the notification information, and be an identifier or an index that indicates the cell or the frequency that is to be allocated to the terminal apparatus 1. For example, identifier A and a resource (frequency and time information) that corresponds to identifier A, identifier B and resource information that corresponds to identifier B, and identifier C and resource information that corresponds to identifier C are broadcast as pieces of resource information that are used for the device-to-device data communication. In a case where the terminal apparatus 1 performs communication with resources that correspond to identifier A and identifier C, the terminal apparatus 1 may notify the base station apparatus 2 of identifier A and identifier C in a state of being included in the device-to-device data communication status notification message. Alternatively, for example, in a case where the terminal apparatus 1 makes a connection to the base station apparatus 2 using multiple cells (cell A, cell B, and cell C), if the terminal apparatus 1 performs the communication with resources of cell A and cell C, the terminal apparatus 1 may notify the base station apparatus 2 of identifier A and identifier C in a state of being included in the device-to-device data communication status notification message.

Furthermore, in a case where a change in the resource that is used for the device-to-device data communication takes place, the terminal apparatus 1 may trigger notification of the device-to-device data communication status notification message. Furthermore, the base station apparatus 2 may reply to the device-to-device data communication status notification message with approval or disapproval of the device-to-device data communication. Accordingly, it is possible that the device-to-device data communication on the network side is performed.

The terminal apparatus 1 that performs the communication in the device-to-device data communication selects an identifier of a resource to which the transmission data belongs, from among identifiers that are notified with device-to-device data status notification (Step S54), and notifies the base station apparatus 2 of the identifier information (the identifier, an index that is associated with the identifier that is notified with the device-to-device data communication status notification, and/or the like) in a state of being attached to the transmission resource allocation request message (Step S55). For example, in a case where identifier A and identifier C is notified to the base station apparatus 2 in a state of being included in the device-to-device data communication status notification message, an index numbers is assigned to the identifier that is explicitly or implicitly and the index number may be notified with the transmission resource allocation request message.

As the transmission resource allocation request message, for example, the Buffer Status Report of the MAC layer may be used, and the transmission resource allocation request message may be signaling of a different MAC layer or a message of the RRC layer. In the case where the transmission resource allocation request message is the Buffer Status Report, in order to include the identifier information in the Buffer Status Report, a different logical channel identifier from the logical channel identifier (LCID) of the Buffer Status Report in the related art may be used. Furthermore, the Buffer Status Report includes the identifier information and the index indicating the buffer size level. Furthermore, in a case where the transmission resource allocation request message is the Buffer Status Report, an index (the index that is notified in Step S55, an index that is based on numerical order of or order of arrangement of the identifiers that are notified in Step S55, or the like) may be configured to be in a field indicating the Logical Channel Group and may be notified. Furthermore, in the case where different signaling or a different message is used, at least the identifier information is included.

Based on the notified identifier information, the base station apparatus 2 that receives the transmission resource allocation request message determines the transmission resource that is to be allocated to the terminal apparatus 1, from the resource that is to be used by the terminal apparatus 1, and notifies the terminal apparatus 1 of the determined transmission resource (Step S56).

When the device-to-device data communication is ended (when a change in the in-use resource take place), the terminal apparatus 1 may notify the base station apparatus 2 of device-to-device data communication status notification message (Step S57).

With this configuration, the terminal apparatus 1 can notify the base station apparatus 2 of the information on the resource that is to be used at the time of the starting and ending of the device-to-device data communication, as the device-to-device data communication status notification, and, at the time of the transmission resource request, can notify the base station apparatus 2 of the identifier information that is based on information in the device-to-device data communication status notification, and the base station apparatus 2 can select the transmission resource to be allocated based on the notified identifier information. Furthermore, the transmission message can be decreased in size by using the index that corresponds to the identifier of the resource to which the transmission data belongs, in the field indicating the Logical Channel Group.

According to a third embodiment, the terminal apparatus 1 notifies the base station apparatus 2 of the information on the resource that is to be used at the time of the starting and ending of the device-to-device data communication, as the device-to-device data communication notification, and, at the time of the transmission resource request, notifies the base station apparatus 2 of the identifier information that is based on the information in the device-to-device data communication status notification, and the base station apparatus 2 selects the transmission resource to be allocated based on the notified identifier information. Thus, for example, even in the case where the communication is performed using multiple cells with the carrier aggregation or the like, even in the case where the frequency for the specific communication other than the frequency for the normal communication is secured, and even in the case where the resource that differs from one service to another or from one application to another is used, the allocation of the suitable transmission resource is possible. Furthermore, even in the case where the terminal apparatus 1 performs the communication service among multiple devices, the allocation of the suitable transmission resource is possible. Furthermore, based on an amount of delay, a bit rate, or the like that is requested by the service or the application which corresponds to the identifier information, the allocation of the suitable transmission resource is possible.

According to each embodiment described above, the example is described in which the terminal apparatus 1 acquires the transmission resource from the base station apparatus 2. However, in a case where the base station apparatus 2 notifies the terminal apparatus 1 of a resource (a schedule-type resource) for which a dedicated transmission resource request is indispensable and a resource (autonomous-type resource) for which a dedicated transmission resource request is not indispensable, as a resource for the device-to-device data communication, using the broadcast information or the notification information, in such a manner that the terminal apparatus 1 can identify the scheduled-type resource and the autonomous-type resource, the terminal apparatus 1 may determine whether or not the transmission resource allocation request is performed, based on the broadcast information or the notification information. Accordingly, unnecessary signaling can be precluded.

In the case where the terminal apparatus 1 requests the schedule-type resource for a cell (a frequency) other than the cell (the frequency) that is controlled by the base station apparatus 2 itself, the base station apparatus 2 may cause the terminal apparatus 1 to perform the handover to the cell of the base station apparatus 2 that controls the resource for the cell (frequency). Accordingly, efficient resource allocation can be performed.

Furthermore, according to each embodiment described above, the base station apparatus 2 may notify the terminal apparatus 1 of a resource that the terminal apparatus 1 itself controls or a resource that a different device controls, as the resource for the device-to-device data communication, using the broadcast information or the notification information, using the broadcast information or the notification information, in such a manner that the terminal apparatus 1 can identify the resource that the terminal apparatus 1 itself controls and the resource that a different device controls. In this case, based on the broadcast information or the notification information, only in case where the resource that the base station apparatus 1 which covers the serving cell controls is used, the terminal apparatus 1 may make the transmission resource allocation request. Accordingly, unnecessary signaling can be precluded.

Furthermore, according to each embodiment described above, the example is described in which the resources for the device-to-device data communication are configured for every frequency or cell, and a resource that is used by the terminal apparatus 1 is selected from among these resources, but no limitation to this is imposed. The same can be applied even in a case where multiple resources are configured within the same cell (the frequency).

Furthermore, according to each embodiment described above, a function of the base station apparatus 2 may be built into a different apparatus. For example, a function of allocating the transmission resource for the above-described device-to-device data communication may be built into the terminal apparatus 1 that is a master device for the device-to-device data communication.

Moreover, the embodiments described above are only simple examples, and can be realized using various modification examples and substitution examples. For example, it is possible that an uplink transmission scheme is also applied to a communication system in compliance with either a frequency division duplex (FDD) scheme or a time division duplex (TDD) scheme. Furthermore, because the name of each parameter or each event that is described according to the embodiments is given for convenience of description, even if the name that is applied in practice and the name according to the embodiments of the present invention are different from each other, this does not exert any influence on the gist of the invention claimed, in the embodiments of the present invention.

Furthermore, the term "connection" that is used in each embodiment is not limited only to the configuration in which a certain device or apparatus and another certain device or apparatus are connected directly to each other using a physical circuit, and includes the meaning of a configuration in which a connection is made logically or of a configuration in which a wireless connection is made using a wireless technology.

Furthermore, the terminal apparatuses 1 include not only a portable or moving mobile station apparatus, but also an stationary-type electronic apparatus that is installed indoors or outdoors, or a non-moving-type electronic apparatus, for example, an AV apparatus, a kitchen apparatus, a cleaning and washing machine, an air-conditioning apparatus, office equipment, a vending machine, other household apparatuses or measuring apparatuses, a vehicle-mounted apparatus, and a device that results from building a communication function into a wearable device or a health care device that is capable of be worn on a human body. Furthermore, the terminal apparatus 1 is used not only for human-to-human or human-to-machine communication, but also for a machine-to-machine communication (Machine Type Communication).

The terminal apparatus 1 is also referred to as a user terminal, a mobile station apparatus, a communication terminal, a mobile machine, a terminal, a User Equipment (UE), or a Mobile Station (MS). The base station apparatus 2 is also referred to as a wireless base station apparatus, a base station, a wireless base station, a fixed station, a NodeB (NB), an evolved Node B (eNB), a Base Transceiver Station (BTS), or a Base Station (BS).

Moreover, the base station apparatus 2 is referred to as the NB in UMTS that is stipulated by 3GPP, and as the eNB in EUTRA or Advanced EUTRA. Moreover, the terminal apparatus 1 is also referred to as the UE in UMTS that is stipulated by 3GPP, EUTRA, and Advanced EUTRA.

Furthermore, for convenience of description, the method, the means, and the algorithm step of realizing the functions of, some of the functions, of the units of each of the terminal apparatus 1 and the base station apparatus 2 are described in specific combinations referring to the functional block diagrams, but these can be realized directly by software, a software module that is implemented by a processor, or combinations of these.

If the method, the means, and the algorithm step are built in hardware, in addition to being constituted as described referring to the block diagrams, the terminal apparatus 1 and the base station apparatus 2 each are constituted from a power supply device or battery that supplies power to the terminal apparatus 1 and the base station apparatus 2, a display device such as a liquid crystal display, a display drive device, a memory, an input and output interface, input and output terminals, a speaker, and other peripheral devices.

If the method, the means, and the algorithm step are built in software, the function can be retained as one or more commands or codes on a computer-readable medium, and can be transmitted. The computer-readable media include both of a communication media or a computer recording media that helps to carry a computer program from one place to another place.

Then, one or more commands or codes may be recorded on the computer-readable recording medium, a computer system be caused to read and execute the one or more command or codes that are recorded on the recording medium to perform control of the terminal apparatus 1 or the base station apparatus 2. Moreover, the "computer system" here is defined as including an OS and hardware components such as a peripheral device.

The operations that are described according to each embodiment of the present invention may be realized with a program. A program running on the terminal apparatus 1 and the base station apparatus 2 according to each embodiment of the present invention is a program (a program for causing a computer to operate) that controls a CPU and the like in such a manner as to realize the above-described functions of each embodiment according to each embodiment of the present invention. Then, pieces of information that are handled in the apparatus and the device are temporarily stored in a RAM while being processed. Thereafter, the pieces of information are stored in various ROMs or HDDs, and if need arises, is read by the CPU to be modified or written.

Furthermore, in some cases, the functions of the embodiments described above are realized by executing the program, and in addition, the functions of each embodiment of the present invention are realized by performing processing in conjunction with an operating system or other application programs, based on an instruction from the program.

Furthermore, the "computer-readable recording medium" refers to a portable medium, such as a semiconductor medium (for example, a RAM, a nonvolatile memory card, or the like), an optical recording medium (for example, a DVD, an MO, an MD, a CD, a BD, or the like), and a magnetic recording medium (for example, a magnetic tape, a flexible disk, or the like), and a recording device, such as a disk unit that is built into the computer system. Moreover, the "computer-readable recording media" is defined as including a medium that dynamically retains the program for a short period of time, such as a communication line that is available when transmitting the program over a network such as the Internet or over a communication network such as a telephone network, and a medium that retains the program for a fixed period of time, such as a volatile memory within the computer system, which functions as a server or a client in a case where the program is retained dynamically for a short period of time.

Furthermore, the program described above may be one for realizing some of the functions described above and additionally may be one that can realize the functions described above in combination with a program that is already recorded in the computer system.

Furthermore, functional blocks or all features of each of the terminal apparatus 1 and the base station apparatus 2 according to each embodiment described above can be built into or implemented by a general-purpose processor, a digital signal processor (DSP), an application-specific integrated circuit (ASIC) or a general-purpose arbitrary integrated circuit (IC), a field programmable gate-array signal (FPGA) or other programmable logic devices, a discrete gate or a transistor logic, a discrete hardware component, or a combination of these.

The general-purpose processor may be a microprocessor, and instead, the processor may be a conventional processor, a controller, a microcontroller, or a state machine. The general-purpose processor or each circuit described above may be constituted as a digital circuit, and may be constituted as an analog circuit.

Furthermore, the processor may be built as a combination of computing devices. For example, the processor may be a DSP and a microprocessor, multiple microprocessors, one or more microprocessors that are connected to a DSP core, or a combination of other such constitutions.

The embodiments of the invention are described in detail above based on the specific examples, but it is apparent that the nature of each of the embodiments of the present invention and a scope of claims are not limited to the specific examples. A change in design and the like that fall within the scope that does not depart from the gist of the invention are also included. That is, the description in the present specification serves the purpose of providing an exemplary description, and does not impose any limitation to each embodiment of the present invention.

Furthermore, various modifications are possible within the scope of the present invention defined by claims, and embodiments that are implemented by suitably combining technical means that are disclosed according to different embodiments are also included in the technical scope of the present invention. Furthermore, a configuration in which a constituent element that achieves the same effect is substituted for the one that is described according to each embodiment described above is also included in the technical scope of the present invention.

INDUSTRIAL APPLICABILITY

The present invention can be applied to a mobile phone, a personal computer, a tablet-type computer, and the like.

DESCRIPTION OF REFERENCE NUMERALS

1 TERMINAL APPARATUS
2, 2-1, 2-2 BASE STATION APPARATUS
101, 201 RECEPTION UNIT
102, 202 DEMODULATION UNIT
103, 203 DECODING UNIT
104, 204 RECEPTION DATA CONTROL UNIT
105, 205 PHYSICAL LAYER CONTROL UNIT
106, 206 TRANSMISSION DATA CONTROL UNIT
107, 207 CODING UNIT
108, 208 MODULATION UNIT
109, 209 TRANSMISSION UNIT
110, 210 RADIO RESOURCE CONTROL UNIT
211 NETWORK SIGNAL TRANSMISSION AND RECEPTION UNIT

The invention claimed is:

1. A terminal device configured to communicate with a network, the terminal device comprising:
transmitting circuitry configured and/or programmed to:
   transmit a first buffer status report used to provide the network with first information about an amount of transmission data of a communication between the terminal device and the network, and
   transmit a second buffer status report used to provide the network with second information about an amount of transmission data of a direct communication between a plurality of terminal devices including the terminal device, the second information being different from the first information,
   transmit, to the network, third information about information relevant to the direct communication, including one or a plurality of identifiers associated with a logical channel group of the direct communication, the first information, the second information, and third information being different from one another, wherein the first buffer status report contains one or plurality of first buffer size information fields corresponding to the logical channel group, the second buffer status report contains one or plurality of second buffer size information fields and one or a plurality of index fields indicating a destination corresponding to the one or the plurality of the second buffer size information fields, and one or a plurality of values in one or the plurality of the index fields are associated with the one or the plurality of identifiers reported in the third information.

2. A communication method for a terminal device configured to communicate with a network, the communication method comprising:

transmitting a first buffer status report used to provide the network with first information about an amount of transmission data of a communication between the terminal device and the network;

transmitting a second buffer status report used to provide the network with second information about an amount of transmission data of a direct communication between a plurality of terminal devices including the terminal device, the second information being different from the first information;

transmitting, to the network, third information about information relevant to the direct communication, including one or a plurality of identifiers associated with a logical channel group of the direct communication, the first information, the second information, and third information being different from one another, wherein the first buffer status report contains one or plurality of first buffer size information fields corresponding to the logical channel group, the second buffer status report contains one or plurality of second buffer size information fields and one or a plurality of index fields indicating a destination corresponding to the one or the plurality of the second buffer size information fields, and one or a plurality of values in one or the plurality of the index fields are associated with the one or the plurality of identifiers reported in the third information.

3. A base station device configured to communicate with a network, the base station device comprising:

receiving circuitry configured and/or programmed to:

receive a first buffer status report used to provide the network with first information about an amount of transmission data of a communication between a terminal device and the network, and receive a second buffer status report used to provide the network with second information about an amount of transmission data of a direct communication between a plurality of terminal devices including the terminal device, the second information being different from the first information, receive, from the network, third information about information relevant to the direct communication, including one or a plurality of identifiers associated with a logical channel group of the direct communication, the first information, the second information, and third information being different from one another, wherein the first buffer status report contains one or plurality of first buffer size information fields corresponding to the logical channel group, the second buffer status report contains one or plurality of second buffer size information fields and one or a plurality of index fields indicating a destination corresponding to the one or the plurality of the second buffer size information fields, and one or a plurality of values in one or the plurality of the index fields are associated with the one or the plurality of identifiers reported in the third information.

4. A communication method for a base station device configured to communicate with a network, the communication method comprising:

receiving a first buffer status report used to provide the network with first information about an amount of transmission data of a communication between a terminal device and the network; and receiving a second buffer status report used to provide the network with second information about an amount of transmission data of a direct communication between a plurality of terminal devices including the terminal device, the second information being different from the first information, receiving, from the network, third information about information relevant to the direct communication, including one or a plurality of identifiers associated with a logical channel group of the direct communication, the first information, the second information, and third information being different from one another, wherein the first buffer status report contains one or plurality of first buffer size information fields corresponding to the logical channel group, the second buffer status report contains one or plurality of second buffer size information fields and one or a plurality of index fields indicating a destination corresponding to the one or the plurality of the second buffer size information fields, and one or a plurality of values in one or the plurality of the index fields are associated with the one or the plurality of identifiers reported in the third information.

* * * * *